(12) United States Patent
Li et al.

(10) Patent No.: US 9,959,794 B2
(45) Date of Patent: May 1, 2018

(54) ELECTRONIC DEVICE, PROCESSING METHOD AND DEVICE

(71) Applicant: Lenovo (Beijing) Co., Ltd., Beijing (CN)

(72) Inventors: Bin Li, Beijing (CN); Yiqiang Yan, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 138 days.

(21) Appl. No.: 14/640,098

(22) Filed: Mar. 6, 2015

(65) Prior Publication Data

US 2016/0188276 A1 Jun. 30, 2016

(30) Foreign Application Priority Data

Dec. 24, 2014 (CN) .......................... 2014 1 0820969

(51) Int. Cl.
*G06F 3/14* (2006.01)
*G09G 3/00* (2006.01)
*G09G 3/20* (2006.01)
*G06F 3/0487* (2013.01)
*G06F 1/16* (2006.01)
*H04M 1/02* (2006.01)

(52) U.S. Cl.
CPC ............ *G09G 3/001* (2013.01); *G06F 1/1615* (2013.01); *G06F 1/1677* (2013.01); *G06F 3/0487* (2013.01); *G09G 3/20* (2013.01); *H04M 1/0241* (2013.01); *G09G 2300/023* (2013.01); *G09G 2300/026* (2013.01); *G09G 2354/00* (2013.01); *G09G 2360/04* (2013.01)

(58) Field of Classification Search
None
See application file for complete search history.

(56) References Cited

U.S. PATENT DOCUMENTS

| 9,229,485 B2 | 1/2016 | Ding | |
| 2011/0006971 A1* | 1/2011 | Ebey | G06F 1/1616 345/1.3 |
| 2011/0319140 A1* | 12/2011 | Kanbe | G06F 1/1624 455/566 |

(Continued)

FOREIGN PATENT DOCUMENTS

| CN | 101771734 A | 7/2010 |
| CN | 102692960 A | 9/2012 |

(Continued)

OTHER PUBLICATIONS

First Chinese Office Action regarding Application No. 201410820969.3 dated Dec. 21, 2017. English summary provided by Unitalen Attorneys at Law.

*Primary Examiner* — William Boddie
*Assistant Examiner* — David Lee
(74) *Attorney, Agent, or Firm* — Harness, Dickey & Pierce, P.L.C.

(57) ABSTRACT

An electronic device, a processing method and a device are provided. The electronic device includes: a first and second display devices, an input device, a first component and a second component, a detection device configured to detect a relative position relation between the two components, a processing device is configured to control the first display device or the second display device in different cases to respond to operation data collected by the input device.

8 Claims, 24 Drawing Sheets

(56) References Cited

U.S. PATENT DOCUMENTS

| | | | |
|---|---|---|---|
| 2012/0081270 A1* | 4/2012 | Gimpl | G06F 1/1616 345/1.3 |
| 2012/0144323 A1* | 6/2012 | Sirpal | G06F 3/1431 715/761 |
| 2012/0243165 A1 | 9/2012 | Chang et al. | |
| 2012/0272128 A1* | 10/2012 | Takaku | G06F 1/1624 715/205 |
| 2012/0276958 A1* | 11/2012 | Inami | H04M 1/0237 455/566 |
| 2012/0299813 A1* | 11/2012 | Kang | G06F 1/1641 345/156 |
| 2013/0012273 A1* | 1/2013 | Sato | G06F 1/1624 455/566 |
| 2013/0027364 A1* | 1/2013 | Kim | G06F 9/4443 345/204 |
| 2013/0033485 A1* | 2/2013 | Kollin | G06F 1/1637 345/419 |
| 2013/0222722 A1* | 8/2013 | Zhao | G09G 5/36 349/33 |
| 2013/0275742 A1* | 10/2013 | Shao | G06F 9/48 713/100 |
| 2013/0314348 A1 | 11/2013 | Luo et al. | |
| 2014/0002978 A1 | 1/2014 | Ding | |
| 2014/0082529 A1* | 3/2014 | Yamada | G06F 3/1423 715/761 |
| 2014/0120983 A1* | 5/2014 | Lam | H04W 84/18 455/557 |
| 2014/0168070 A1* | 6/2014 | Jeong | G06F 3/013 345/156 |
| 2014/0218266 A1* | 8/2014 | Chen | G06F 3/1446 345/1.3 |

FOREIGN PATENT DOCUMENTS

| | | |
|---|---|---|
| CN | 103425197 A | 12/2013 |
| CN | 103513710 A | 1/2014 |
| CN | 203811898 U | 9/2014 |
| JP | 2009216933 A | 9/2009 |

\* cited by examiner

ELECTRONIC DEVICE, PROCESSING METHOD AND DEVICE

CROSS REFERENCE TO RELATED APPLICATIONS

The present application claims the priority to Chinese Patent Application No. 201410820969.3, entitled "ELECTRONIC DEVICE, PROCESSING METHOD AND DEVICE", filed on Dec. 24, 2014 with the State Intellectual Property Office of People's Republic of China, which is incorporated herein by reference in its entirety.

FIELD

The disclosure relates to the technical field of mechanical design, in particular to an electronic device, a processing method and a processing device.

BACKGROUND

With the development of electronic technology, various terminal devices, particularly, dual-screen devices, are widely used in people's life.

A dual-screen device has two screens. To control input of the two screens, two touch pads corresponding to the two screens are normally disposed in the electronic device.

According to above technology, the two touch pads often may result in high complexity of a mechanical system and a large space occupation due to a large volume, cause high energy consumption and reduce a battery life of the device.

SUMMARY

An electronic device is provided according to the disclosure. The electronic device includes: a first display device configured to display a first content; a second display device configured to display a second content; an input device configured to collect operation data; a first component and a second component, where the first component and the second component are connected to each other through a connector, there are a first relative position relation and a second relative position relation between the first component and the second component through the connector, one or two of a first viewable area of the first display device, a second viewable area of the second display device and a collection area of the input device are located on the first component, and other areas of the first viewable area, the second viewable area and the collection area are located on the second component; a detection device configured to determine whether the first relative position relation or the second relative position relation exists between the first component and the second component; and a processing device configured to control the first display device to switch from displaying the first content to displaying a third content in response to operation data collected by the input device, in a case that there is the first relative position relation between the first component and the second component; and control the second display device to switch from displaying the second content to displaying a fourth content in response to the operation data collected by the input device, in a case that there is the second relative position relation between the first component and the second component.

A processing method is further provided according to the disclosure. The method includes: whether a first relative position relation or a second relative position relation between a first component and a second component is determined; where the first component is connected to the second component through a connector, and there is the first relative position relation or the second relative position relation between the first component and the second component, one or two of a first viewable area of a first display device, a second viewable area of a second display device and a collection area of an input device are located on the first component, and other areas of the first viewable area, the second viewable area and the collection area are located on the second component; the first display device is controlled to switch from displaying a first content to displaying a third content according to operation data collected by the input device, in a case that there is the first relative position relation between the first component and the second component; and the second display device is controlled to switch from displaying a second content to displaying a fourth content according to the operation data collected by the input device, in a case that there is the second relative position relation between the first component and the second component.

A processing device is further provided according to the disclosure. The device includes: a relation determining unit, a first control unit and a second control unit; the relation determining unit is configured to determine whether a first relative position relation or a second relative position relation exists between a first component and a second component, trigger a first control unit in a case that there is the first relative position relation between the first component and the second component, and trigger a second control unit in a case that there is the second relative position relation between the first component and the second component; the first control unit is configured to control a first display device to switch from displaying a first content to displaying a third content according to operation data collected by an input device; and the second control unit is configured to control a second display device to switch from displaying a second content to displaying a fourth content according to the operation data collected by the input device.

BRIEF DESCRIPTION OF THE DRAWINGS

Technical solutions for the embodiments of the present disclosure more clearly, the following briefly describes the drawings involved in the embodiments of the present disclosure. Apparently, the drawings described below are embodiments, and persons of ordinary skill in the art can derive other drawings according to the drawings without any creative effort.

DETAILED DESCRIPTION

Technical solutions of the embodiments of the present disclosure will be illustrated completely and clearly with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the scope of the present disclosure.

Figure 1:
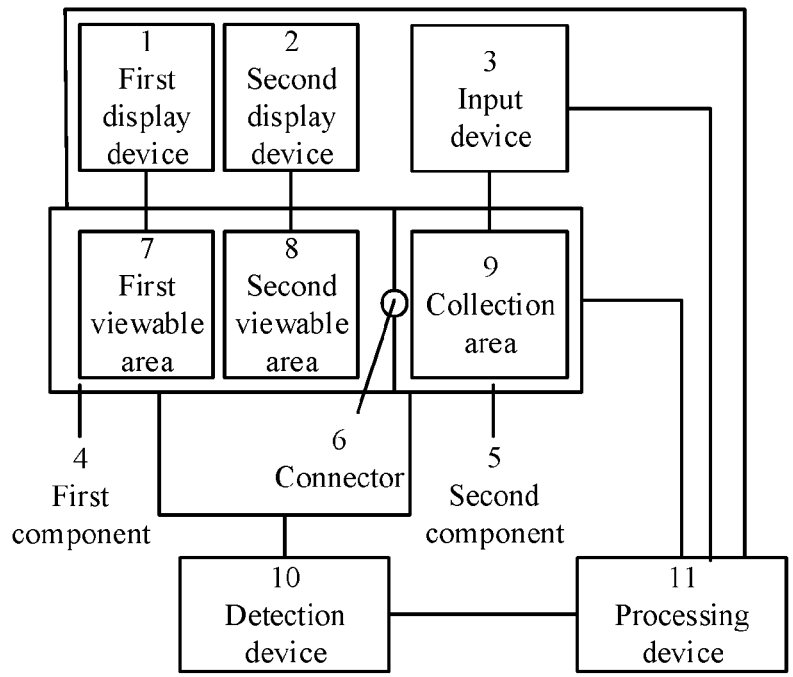
FIG. 1 is a structural diagram of an electronic device according to a first embodiment of the disclosure.

FIG. 1 is a schematic structural diagram of an electronic device according a first embodiment of the disclosure. The electronic device may include the following components.

A first display device 1 is configured to display a first content.

A second display device 2 is configured to display a second content.

The first content and the second content may refer to data content including characters or images, such as text display content, or, may be empty content. That is, in a case that the first display device 1 and the second display device 2 are in a black screen state, i.e., an off state, the first content and the second content are empty content in the black screen state.

It is should be noted that a user at a specific position may perceive the first content displayed by the first display device 1 from a first viewable area 7, and may perceive the second content displayed by the second display device 2 from a second viewable area 8.

An input device 3 is configured to collect operation data.

The input device 3 may be a touch pad, etc. The input device collects operation data may by operation of the user on a collection area 9 of the input device 3. The collection area is a collection area for a contact input device, such as a collection area for a touch input device or a collection area for physical and mechanical buttons.

A first component 4 is connected to a second component 5 through a connector 6. Through the connector 6, a first relative position relation and a second relative position relation for the first component 4 and the second component 5 may be formed. One or two of the first viewable area 7 of the first display device 1, the second viewable area 8 of the second display device 2 and the collection area 9 of the input device are located on the first component 4, and rest areas of the first viewable area 7, the second viewable area 8 and the collection area 9 are located on the second component 5.

Generally, distribution of the first viewable area 7, the second viewable area 8 and the collection area 9 on the first component 4 and the second component 5 may be implemented as follows.

As shown in FIG. 1, the first viewable area 7 and the second viewable area 8 are located on the first component 4, and the collection area 9 is located on the second component 5.

The first viewable area 7 and the collection area 9 are located on the first component 4 and the second viewable area 8 is located on the second component 5.

The second viewable area 8 and the collection area 9 are located on the first component 4 and the first viewable area 7 is located on the second component 5.

Figure 2:
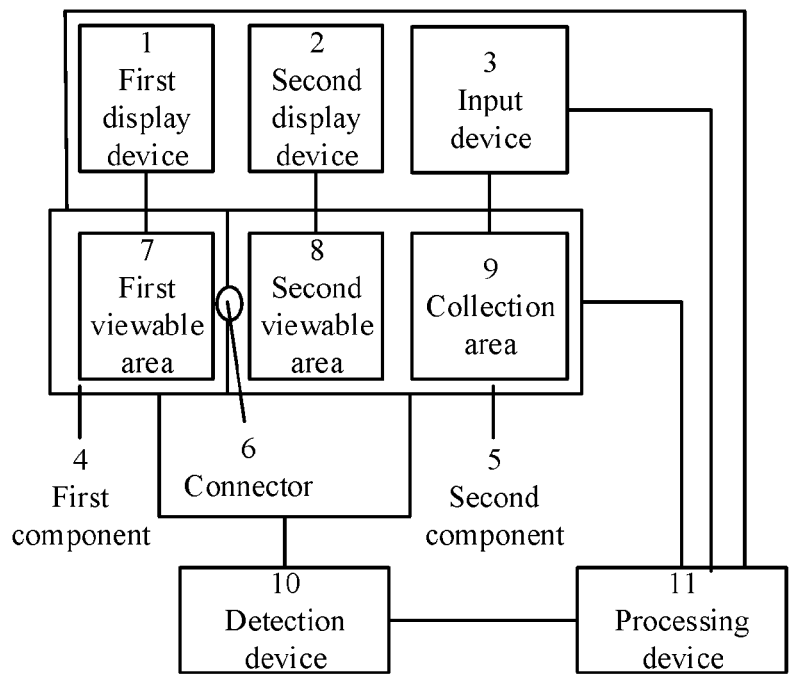
FIG. 2 is another structural diagram of the electronic device according to the first embodiment.

As shown in FIG. 2, the first viewable area 7 is located on the first component 4, and the second viewable area 8 and the collection area 9 are located on the second component 5.

The second viewable area 8 is located on the first component 4, and the first viewable area 7 and the collection area 9 are located on the second component 5.

The collection area 9 is located on the first component 4, and the first viewable area 7 and the second viewable area 8 are located on the second component 5.

It is should be noted that, the connector 6 between the first component 4 and the second component 5 may be a spindle, an elastic strip or a parallel slide rail, etc. The first component 4 may move relative to the second component 5, once the first component 4 is connected to the second component 5 through the connector 6, and the first relative position relation or the second relative position relation between the first component 4 and the second component 5 is formed.

A detection device 10 is configured to determine whether the first component 4 and the second component 5 are in the first relative position relation or the second relative position relation.

The detection device 10 may be disposed on the connector 6, by which in a case that the first component 4 moves relative to the second component 5, the detection device 10 may accurately detect the relative position relation between the first component 4 and the second component 5, to determine whether the first component 4 and the second component 5 are in the first relative position relation or the second relative position relation. Accordingly, the detection device 10 may be disposed on the first component 4, to detect the relative position relation between the first component 4 and the second component 5, after a motion of the second component 5 relative to the first component 4; alternatively, the detection device 10 may be disposed on the second component 5, to detect the relative position relation between the first component 4 and the second component 5, after a motion of the first component 4 relative to the second component 5.

A processing device 11 is configured to control the first display device 1 to switch from displaying the first content to displaying a third content in response to the operation data collected by the input device 3, in a case that the first component 4 is in the first relative position relation with the second component 5; and to control the second display device 2 to switch from displaying the second content to displaying a fourth content in response to the operation data collected by the input device 3, in a case that the first component 4 is in the second relative position relation with the second component 5.

The processing device 11 may be a central processing unit (CPU), to respond to the operation data, after the input device 3 collects the operation data. The processing device 11 may perform corresponding response solution according to the relative position relation between the first component 4 and the second component 5 which is determined by the detection device 10. In other words, after receiving the operation data collected from the collection area 9 of the input device 3, the processing device 11 performs different response solutions based on different relative position relations between the first component 4 and the second component 5. That is, in a case that first component 4 is in the first relative position relation with the second component 5, the processing device 11 performs a first response operation, i.e., the processing device 11 controls the first display device 1 to switch from displaying the first content to displaying the third content; and in a case that the first component 4 is in the second relative position relation with the second component 5, the processing device 11 performs a second response operation, i.e., the processing device 11 controls the second display device 2 to switch from displaying the second content to displaying the fourth content.

In an implementation, while the processing device 11 controls one display device to switch a display content, the content displayed by other display device may be changed, to realize control on display switch of the two display device. For example, while the processing device 11 controls the first display device 1 to switch from displaying the first content to displaying the third content, the second display device 2 keeps displaying the second content, or while the processing device 11 controls the second display device 2 to switch from displaying the second content to displaying the fourth content, the first display device 1 keeps displaying the first content.

It is should be noted that, similarly, the third content and the fourth content may refer to a data content including characters or images such as a text display content, or may be an empty content, but the third content is different from the first content and the fourth content is different from the second content. In other words, the processing device 11 is able to control the first display device 1 and the second display device 2 to switch the display content in response to the operation data. Hence, the processing device 11 according to the embodiment may control the first display device 1 in the black screen state to switch from displaying the first content, which is the empty content, to displaying the third content, which is different from the empty content and includes characters or image data; alternatively, the processing device 11 according to the embodiment may control the first display device 1 to switch from displaying the first content, which includes characters or image data, to displaying the empty content in the black screen state, or the third content which includes characters or image data and is different from the first content. Similarly, the processing device 11 may control the second display device 2 in the black screen state to switch from displaying the second content, which is the empty content, to displaying the fourth content, which includes characters or image data, or, may control the second display device 2 to switch from displaying the second content, which includes characters or image data to displaying the empty content in the black screen state or the fourth content, which includes characters or image data and is different from the second content. For example, the processing device 11 controls the first display device 1 to switch from in the black screen state to a desktop data displaying state in response to the operation data, or controls the first display device 1 to switch from in the desktop data displaying state to the black screen state in response to the operation; and in response to the operation data, the processing device 11 controls the second display device 2 to switch from in the black screen state to the desktop data displaying state, or controls the second display device 2 to switch from in the desktop data displaying state to the black screen state.

It is can be known from the technical solutions that, in the electronic device according to the first embodiment of the disclosure, the first component and the second component are disposed to carry the viewable area of two display device and the collection area of the input device, and the detection device is disposed to detect the relative position relation between the two components in a real-time manner, so that the processing device may control switch for different display devices in response to different data which are collected by the input device in the case that the different relative position relations between the two components. For example, in a case that there is the first relative position relation between the two components, the processing device controls one display device to switch display content, and in a case that there is the second position relation between the two components, the processing device controls the other display device to switch display content. In this embodiment, one input device is used to realize control on display switch for two display devices without disposing two input devices, thereby the complexity of a mechanical system is reduced by reducing mechanical components, the space is reduced by reducing the volume of the electronic device, the complex logic response of a system caused by the fact that the two display devices are respectively controlled by two input device is avoided, the energy consumption is reduced by reducing complexity of the system, and the battery life of the device is improved.

In an actual implementation, in an electronic device according to a second embodiment of the disclosure, it is required that the collection area 9 of the input device 3 is in a relatively viewable state at any moment to ensure that a user is able to use an operator to operate on the input device at any moment. The relatively viewable state refers to a state in which an object is visible to the user to which the operator of the electronic device belongs.

Figure 3A:
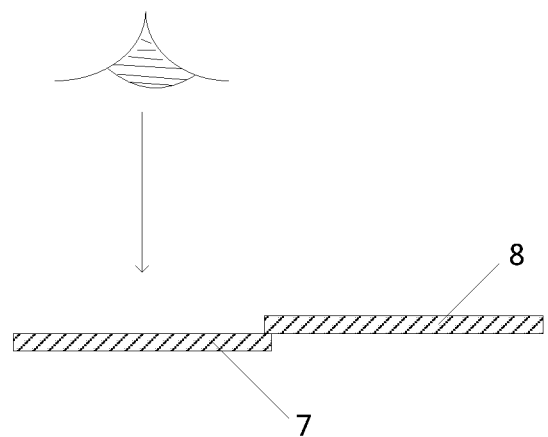
FIGS. 3a, 3b, 4a-4k, 4m, 4n, 5a-5j and 6a-6h are respective schematic structural diagrams of a part of an electronic device according a second embodiment of the disclosure.

Accordingly, in a case that there is the first relative position relation between the first component 4 and the second component 5, the first viewable area 7 is in the relatively viewable state, so that a user at a specific position may perceive the content displayed on the first viewable area 7 through his/her eyes. In this case, as shown in FIG. 3a, the second viewable area 8 may be in the relatively viewable state or a relatively unviewable state, and in response to the operation data collected by the input device, the processing device 11 controls the first display device 1 to switch from displaying the first content to displaying the third content.

In a case that there is the second relative position relation between the first component 4 and the second component 5, the first viewable area 7 is in the relatively unviewable state. In this case, as shown in FIG. 3b, the second viewable area 8 is in the relatively viewable state, and in response to the operation data collected by the input device, the processing device 11 controls the second display device to switch from displaying the second content to displaying the fourth content.

Figure 3B:
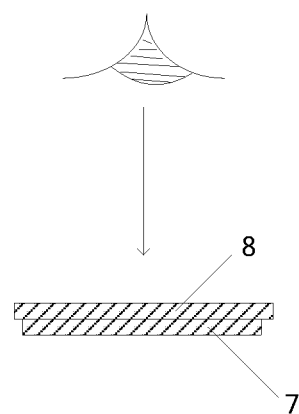

That is, a priority of switch control for the first display device 1 to which the first viewable area 7 belongs to is higher than that for the second display device 2 to which the second viewable area 8 belongs to, i.e., in a case that the first viewable area 7 and the second viewable area 8 are both in the relatively viewable states, the processing device 11 performs display control on the first display device 1 corresponding to the first viewable area 7 according to the operation data collected by the input device 3, and only in a case that the first viewable area 7 of the first display device 1 is in the relatively unviewable state, for example, as shown in FIG. 3b, the first viewable area 7 is blocked, the processing device 11 may perform display control on the second display device 2 corresponding to the second viewable area 8 according to the operation data collected by the input device 3.

That is, the first viewable area 7 and the second viewable area 8 are located on different components respectively or on a same component, and the collection area 9 is located on a component being constantly in the relatively viewable state.

Based on above implementation solutions, the following implementation solutions are provided according to the disclosure.

Figure 4A:
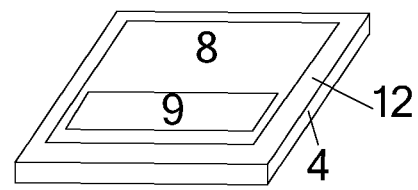
Figure 4B:
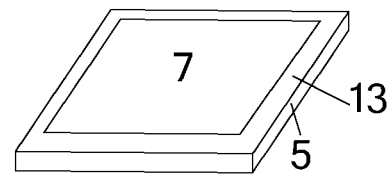

A first solution is that as shown in FIG. 4a, the second viewable area 8 and the collection area 9 are located on a first surface 12 of the first component 4, and the collection area 9 is located at a preset region in the second viewable area 8, where the preset region may be a region in the middle of the second viewable area 8, or a region in the lower half of the second viewable area 8 as shown in FIG. 4a, that is, the collection area 9 overlaps the second viewable area 8, and as shown in a top view of FIG. 4b, the first viewable area 7 is located on a first surface 13 of the second component 5.

Figure 4C:
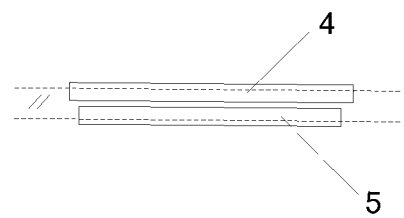

As shown in a side view of FIG. 4c, the first surface 12 of the first component 4 is approximately parallel or parallel to the first surface 13 of the second component 5.

Figure 4D:
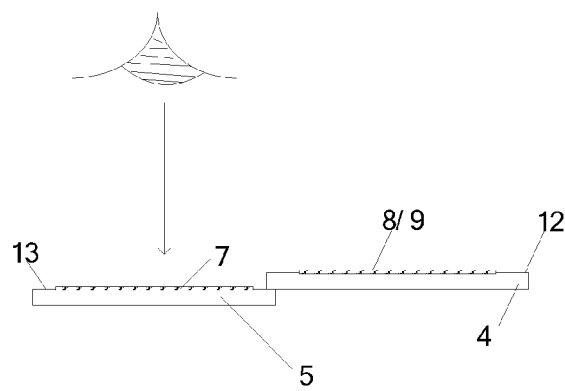

In this solution, the first relative position relation is that the second viewable area 8 of the first component 4 does not overlap the first viewable area 7 of the second component 5 in a direction vertical to a plane where the first viewable area 7 locates or a plane where the second viewable area 8 locates. As shown in a side view of FIG. 4d, the first viewable area 7 is located at the relatively viewable area, in this case, in response to the operation data collected by the input device 3, the processing device 11 controls the first displayer 1 to switch from displaying the first content to displaying the third content.

Figure 4E:
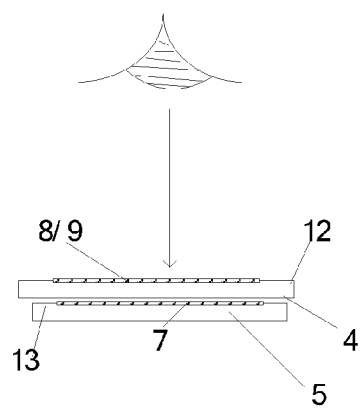

Accordingly, the second relative position relation is that the second viewable area 8 of the first component 4 overlaps the first viewable area 7 of the second component 5 in the direction vertical to the plane where the first viewable area 7 locates. As shown in FIG. 4e, the first viewable area 7 is in the relatively unviewable state, in this case, in response to the operation data collected by the input device 3, the processing device 11 controls the second display device 2 to switch from displaying the second content to displaying the fourth content.

The connector 6 may be a spindle or a slide rail, i.e., the first component 4 is connected to the second component 5 through the spindle or the slide rail.

Figure 4F:
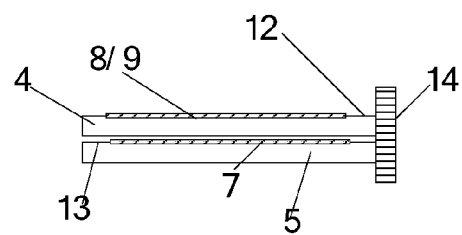
Figure 4G:
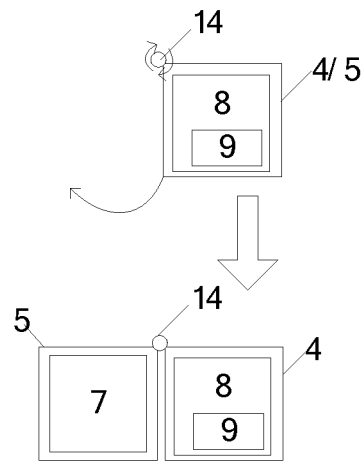

In a case that the first component 4 is connected to the second component 5 through a spindle 14, the spindle 14 is disposed at corresponding corners of the first component 4 and the second component 5, such as top left corners or top right corners; and as shown in FIG. 4f and FIG. 4g, an axis direction of the spindle 14 is vertical to the plane where the first viewable area 7 locates or the plane where the second viewable area 8 locates. Therefore, the second component 5 provided with the first viewable area 7 is able to rotate around the spindle 14, and a predetermined angle is formed between the first component 4 and the second component 5, to make the first viewable area 7 enter into the relatively viewable state, and have a display direction the same as that of the second viewable area 8, as shown in a lower part of FIG. 4g. In a case that the first viewable area 7 is in the relatively viewable state, in response to the operation data collected by the input device 3, the processing device 11 controls the first display device 1 to switch from displaying the first content to displaying the third content. In a case that as shown in an upper part of FIG. 4g, the second component 5 is located below the first component 4 and overlaps the first component 4, the first viewable area 7 is in the relatively unviewable state, and in response to the operation data collected by the input device 3, the processing device 11 controls the second display device 2 to switch from displaying the second content to displaying the fourth content.

Figure 4H:
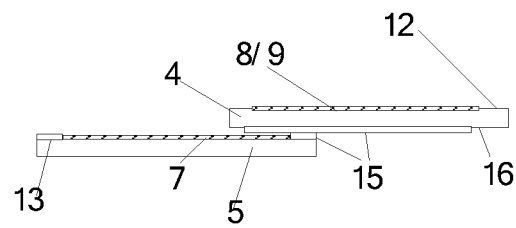
Figure 4I:
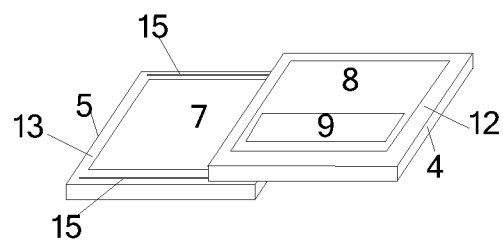
Figure 4J:
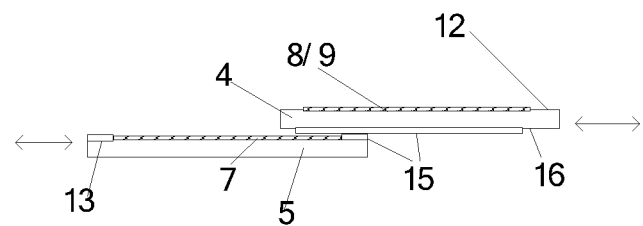

In a case that the first component 4 is connected to the second component 5 through a slide rail 15, the slide rail 15 is disposed between a second surface 16 of the first component 4 and the first surface 13 of the second component 5 and does not overlap the first viewable area 7, where the second surface 16 is a surface of the first component 4 which is opposite to the first surface 12. As shown in FIG. 4h and FIG. 4i, the slide rail 15 has four rails, of which two rails are disposed at two sides of the first viewable area 7 respectively, and accordingly, the other two rails are disposed at two sides of the second surface 16 of the second component 5. Thus, as shown in FIG. 4j, the second component 5 provided with the first viewable area 7 is able to slide in a direction parallel to the first component 4, to make the first viewable area 7 enter into the relatively viewable state, alternatively, the first component 4 is able to slide in a direction parallel to the second component, to make the first viewable area 7 enter into the relatively viewable state. In a case that the first viewable area 7 is in the relatively viewable state, in response to the operation data collected by the input device 3, the processing device 11 controls the first display device 1 to switch from displaying the first content to displaying the third content. Accordingly, in a case that the first component 4 and the second component 5 does not parallelly slide relative to each other, the first component 4 is disposed above the second component 5 in the direction vertical to the plane where the second component 5 locates, and overlaps the first viewable area 7 of the second component 5, and the first viewable area 7 is in the relatively unviewable state, in this case, in response to the operation data collected by the input device 3, the processing device 11 controls the second display device 2 to switch from displaying the second content to displaying the fourth content.

In addition, as shown in FIG. 4a, the collection area 9 is located at the preset region in the second viewable area 8. In other words, the collection area 9 occupies a part of the second viewable area 8, which means that the collection area 9 covers the preset region of the second viewable area 8, where the collection area 9 is smaller than the second viewable area 8. Besides the distribution for the collection area 9 and the second viewable area 8, there are other distributions for the regions, which are shown in FIG. 4k, FIG. 4m and FIG. 4n.

Figure 4K:
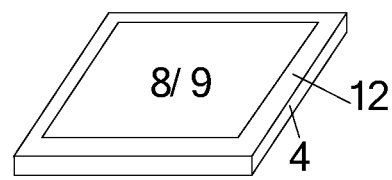

As shown in FIG. 4k, the size of the collection area 9 is the same as that of the second viewable area 8, the collection area 9 completely covers the second viewable area 8, in this case, the second viewable area 8 is capable of displaying content and collecting operation data.

Figure 4M:
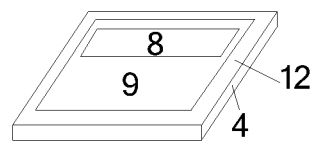

As shown in FIG. 4m, the collection area 9 is larger than the second viewable area 8, covers the entire second viewable area 8, and has a region which the second viewable area 8 does not overlap.

Figure 4N:
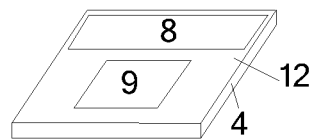

As shown in FIG. 4n, the size of the collection area 9 is irrelevant to that of the second viewable area 8, the collection area 9 does not overlap the second viewable area 8, and together with the second viewable area 8, is disposed on the first surface 12 of the first component 4.

Figure 5A:
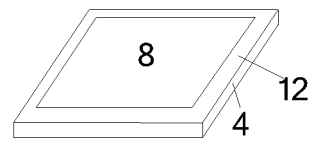
Figure 5B:
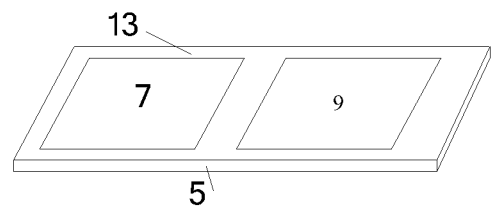

A second solution is that as shown in FIG. 5a, the second viewable area 8 is located on the first surface 12 of the first component 4; and as shown in FIG. 5b, the first viewable area 7 and the collection area 9 are located on the first surface 13 of the second component 5, and the collection area 9 does not overlap the first viewable area 7.

Figure 5C:
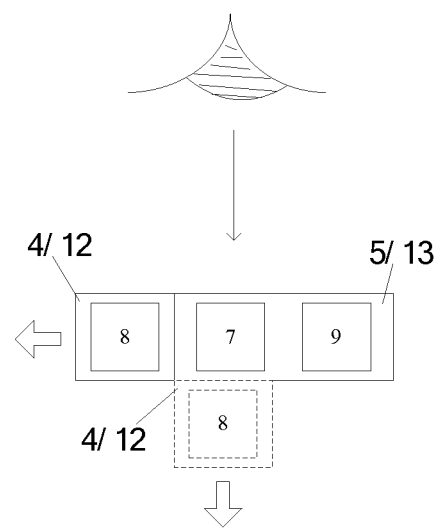
Figure 5D:
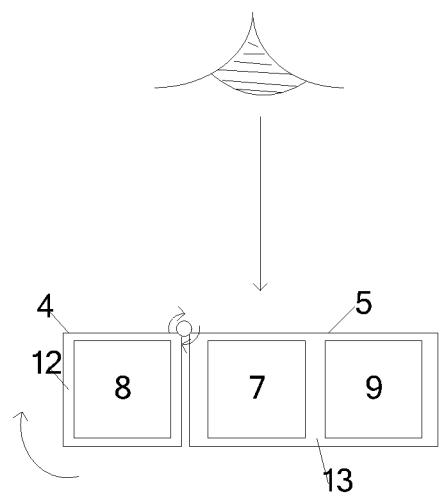
Figure 5E:
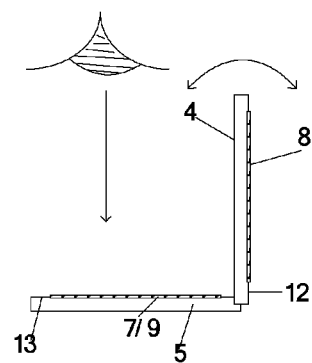

In this solution, the first relative position relation is that the second viewable area 8 of the first component 4 does not overlap the first viewable area 7 of the second component 5 in the direction vertical to the plane where the first viewable area 7 locates or the plane where the second viewable area 8 locates. The expression that the second viewable area 8 does not overlap the first viewable area 7 means that the first viewable area 7 is not blocked in the direction vertical to the first viewable area 7, i.e., in a non-overlapping state, in which the first component 4 where the second viewable area 8 locates slides up and down in a direction parallel to the first viewable area 7 or slides in a direction opposite to the collection area 9 as long as the first viewable area 7 is not blocked, as shown in FIG. 5c; or in which the first component 4 where the second viewable area 8 locates rotates in a direction opposite to the collection area 9 as long as the first viewable area 7 is not blocked, as shown in FIG. 5d and FIG. 5e. In a case that the first component 4 is in the first relative position relation with the second component 5, in response to the operation data collected by the input device 3, the processing device 11 controls the first display device 1 to switch from the first content to the third content.

Figure 5F:
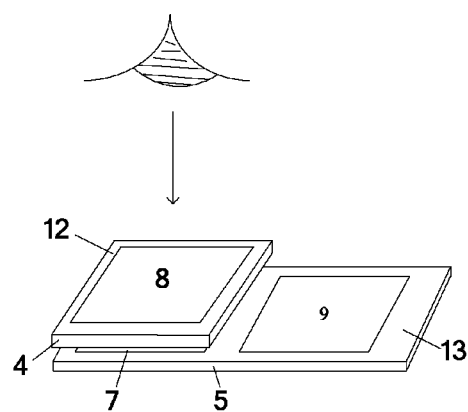

Accordingly, as shown in FIG. 5f, the second relative position relation is that the second viewable area 8 of the first component 4 overlaps the first viewable area 7 of the second component 5 in the direction vertical to the plane where the first viewable area 7 locates, and the first viewable area 7 is in the relatively unviewable state. In a case that there is the second relative position relation between the first component and the second component 5, in response to the operation data collected by the input device 3, the processing device 11 controls the second display device 2 to switch from displaying the second content to displaying the fourth content. It is should be noted that the display direction of the second viewable area 8 is the same as that of the collection area 9 all the time. For example, in a case that the second viewable area 8 does not block the first viewable area 7, as shown in FIG. 5d, the display direction of the second viewable area 8 is the same as those of the first viewable area 7 and the collection area 9; and in a case that the second viewable area 8 blocks the first viewable area 7, the display direction of the second viewable area 8 is still the same as that of the collection area 9.

The connector 6 may be a spindle or a slide rail.

Figure 5G:
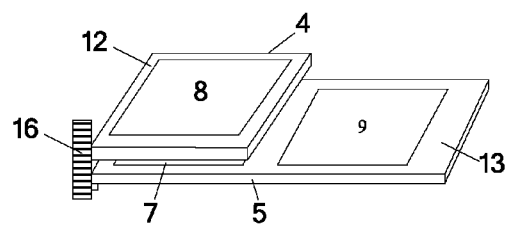

In a case that the first component 4 is connected to the second component 5 through a spindle 17, the spindle 17 is disposed at corresponding corners of the first component 4 and the second component 5, such as top left corners or top right corners, and as shown in FIG. 5d and FIG. 5g, the axis direction of the spindle 17 may be vertical to the plane where the first viewable area 7 locates. Therefore, as shown in FIG. 5d, the first component 4 provided with the second viewable area 8 is able to rotate around the spindle 17, and a predetermined angle is formed between the first component 4 and the second component 5 on a plane parallel to the plane where the first viewable area 7 locates, to make the first viewable area 7 enter into the relatively viewable state. In a case that the first viewable area 7 is in the relatively viewable state, in response to the operation data collected by the input device 3, the processing device 11 controls the first display device 1 to switch from displaying the first content to displaying the third content; In a case that the first component 4 is located above and overlaps the second component 5, as shown in FIG. 5g, the first viewable area 7 is in the relatively unviewable state. In this case, in response to the operation data collected by the input device 3, the processing device 11 controls the second display device 2 to switch from displaying the fourth content to displaying the second content. According to the embodiment, in order to further improve usage experience of a user, the collection area 9, the first viewable area 7 and the second viewable area 8 are all disposed as square areas, to avoid that display content of the first component 4 changes due to self-adaptive change of the display direction, after the second viewable area 8 rotates with the first component 4 around the spindle 16.

Figure 5H:
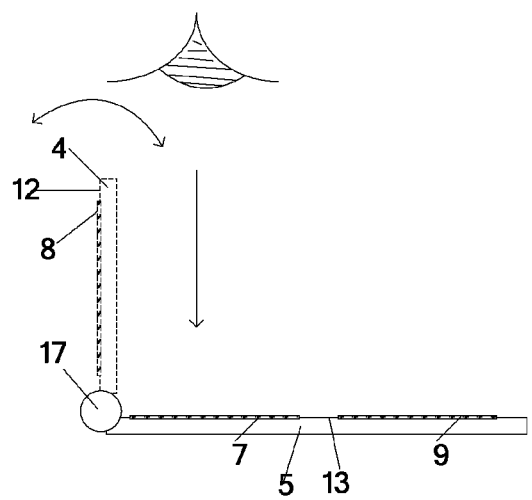
Figure 5I:
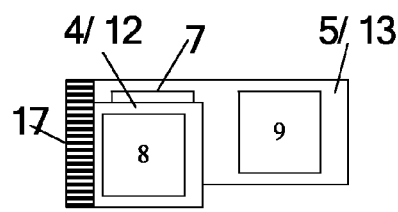

It is should be note that as shown in FIG. 5h, the spindle 17 may alternatively be parallel with the plane where the first viewable area 7 of the second component 5 locates, the spindle 17 is disposed at a corresponding edge for the first component 4 and the second component 5, and the first component 4 provided with the second viewable area 8 is able to rotate around the spindle 17 to form a predetermined angle between the second viewable area 8 and the first viewable area 7 of the second component 5, to make the first viewable area 7 enter into the relatively viewable state. In a case that the first viewable area 7 is in the relatively viewable state, in response to the operation data collected by the input device 3, the processing device 11 controls the first display device 1 to switch from displaying the first content to displaying the third content. In a case that the first component 4 is located above and overlaps the second component 5, as shown in FIG. 5i, the first viewable area 7 is in the relatively unviewable state. In this case, in response to the operation data collected by the input device 3, the processing device 11 controls the second display device 2 to switch from displaying the fourth content to displaying the second content. According to the embodiment, in order to further improve usage experience of the user, the collection area 9, the first viewable area 7 and the second viewable area 8 are all disposed as square areas, to avoid that the display content of the first component 4 changes due to self-adaptive change of the display direction, after the second viewable area 8 rotates with the first component 4 around the spindle 16.

Figure 5J:
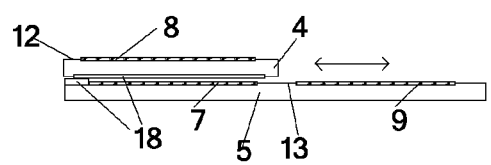

In a case that the first component 4 is connected to the second component 5 through a slide rail 18, referring to the slide rail 15 as shown in FIG. 4i, the slide rail 18 is disposed between the second surface 16 of the first component 4 and the first surface 13 of the second component 5 and does not overlap the first viewable area 7 and the collection area 9. Thus, as shown in FIG. 5c, the first component 4 provided with the second viewable area 8 is able to slide in a direction parallel to the second component 5, to make the first viewable area 7 enter into the relatively viewable state. In a case that the first viewable area 7 is in the relatively viewable state, in response to the operation data collected by the input device 3, the processing device 11 controls the first display device 1 to switch from displaying the first content to displaying the third content. Accordingly, in a case that as shown in FIG. 5j, the first component 4 does not slide relative to the second component 5, the first component 4 overlaps the first viewable area 7 of the second component in the direction vertical to the plane where the second component locates, and the first viewable area 7 is in the relatively unviewable state, in this case, in response to the operation data collected by the input device 3, the processing device 11 controls the second display device 2 to switch from displaying the second content to displaying the fourth content.

Figure 6A:
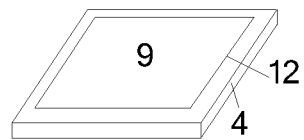
Figure 6B:
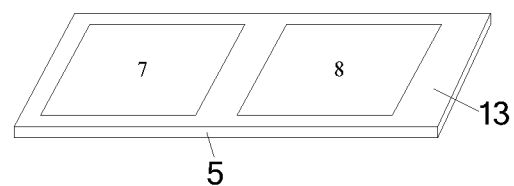
Figure 6C:
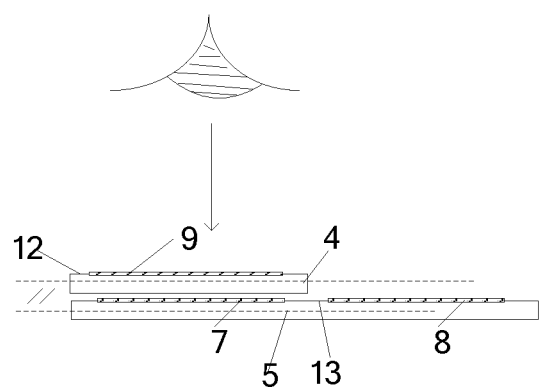

A third solution is that as shown in FIG. 6, the collection area 9 is located on the first surface 12 of the first component 4, as shown in FIG. 6b, the first viewable area 7 and the second viewable area 8 are located on the first surface 13 of the second component 5, the first viewable area 7 and the second viewable area 8 does not overlap the first surface 12, and as shown in FIG. 6c, the first surface 12 of the first component 4 is approximately parallel or parallel to the first surface 13 of the second component 5.

Figure 6D:
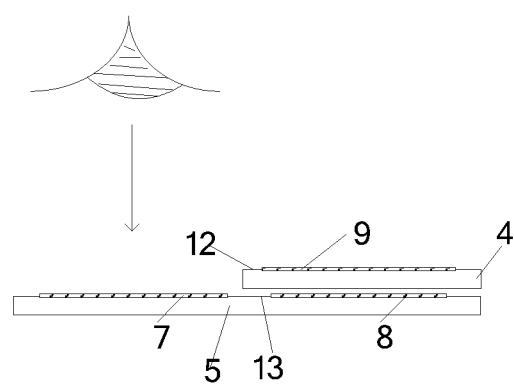

In this solution, the first relative position relation is that the viewable area 9 of the first component 4 overlaps the first viewable area 7 of the component 5 in the direction vertical to the plane where the first viewable area 7 locates or the plane where the collection area 9 locates. As shown in FIG. 6*d*, the first viewable area 7 is located on the relatively viewable area, in this case, in response to the operation data collected by the input device 3, the processing device 11 controls the first display device 1 to switch from displaying the first content to displaying the third content.

Accordingly, the second relative position relation is that the viewable area 9 of the first component 4 overlaps the first viewable area 7 of the component 5 in the direction vertical to the plane where the first viewable area 7 locates or the plane where the collection area 9 locates. As shown in FIG. 6*c*, the first viewable area is in the relatively unviewable state, in this case, in response to the operation data collected by the input device 3, the processing device 11 controls the second display device 2 to switch from displaying the second content to displaying the fourth content.

It is should be noted that in this implementation solution, the collection area 9 of the input device 3 is made of a non-transparent material and is able to block the first viewable area 7 or the second viewable area 8.

The connector 6 may be a spindle or a slide rail.

Figure 6E:
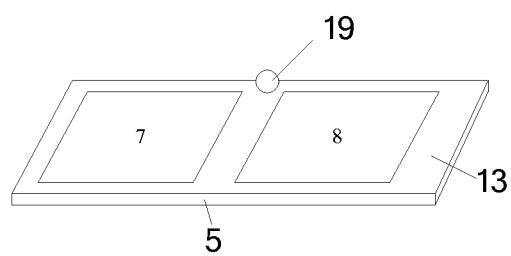
Figure 6F:
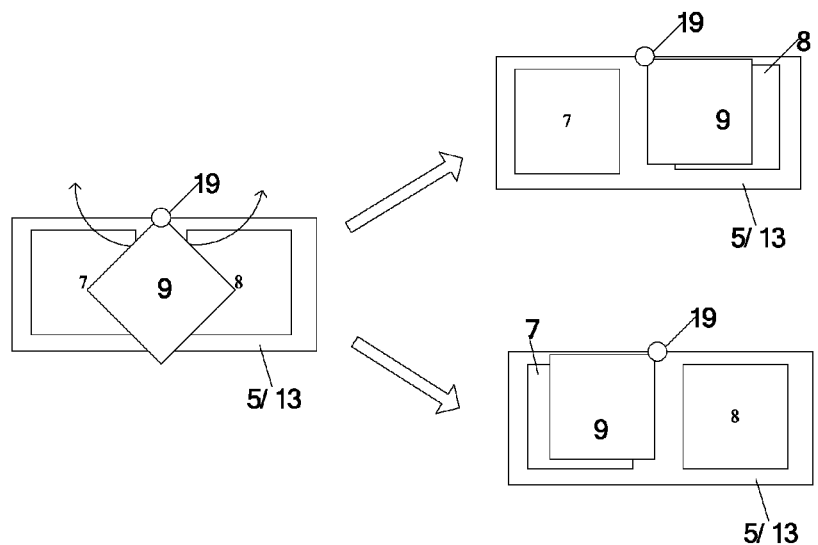

In a case that the first component 4 is connected to the second component 5 through a spindle 19, as shown in FIG. 6*e*, the spindle 19 is vertical to the plane where the first viewable area 7 locates, is disposed on an edge of the second component 5 and is located at a position in the middle of a region between the first viewable area 7 and the second viewable area 8, and as shown in FIG. 6*f*. The first component 4 provided with the collection area 9 is able to rotate around the spindle 19 to block the second viewable area 8 or the first viewable area 7. Therefore, in a case that the first component 4 blocks the second viewable area 8, the first viewable area 7 is in the relatively viewable state, in this case, in response to the operation data collected by the input device 3, the processing device 11 controls the first display device 1 to switch from displaying the first content to displaying the third content; and in a case that the first component 4 blocks the first viewable area 7, the first viewable area 7 is in the relatively unviewable state, in this case, in response to the operation data collected by the input device 3, the processing device 11 controls the second display device 2 to switch from displaying the second content to displaying the fourth content. According to the embodiment, in order to further improve usage experience of the user, the collection area 9, the first viewable area 7 and the second viewable area 8 are all disposed as square areas, to avoid that display content of the first component 4 changes due to self-adaptive change of the display direction, after the first component 4 rotates with the collection area 9 around the spindle 19.

It is should be noted that, the display direction of the collection area 9 can be adjusted adaptively as change of a position and direction of the collection area 9 caused by the fact that the first component 4 rotates with the collection area 9 around the spindle 19, to make the user perform normal input on the collection area 9, thereby avoiding the case that the user needs to adjust the display direction of the collection area 9, which is caused by change of the display direction of the collection area 9 relative to the user due to the rotation of the first component 4.

Figure 6G:
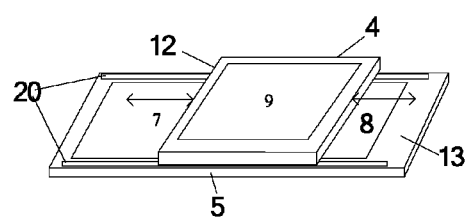
Figure 6H:
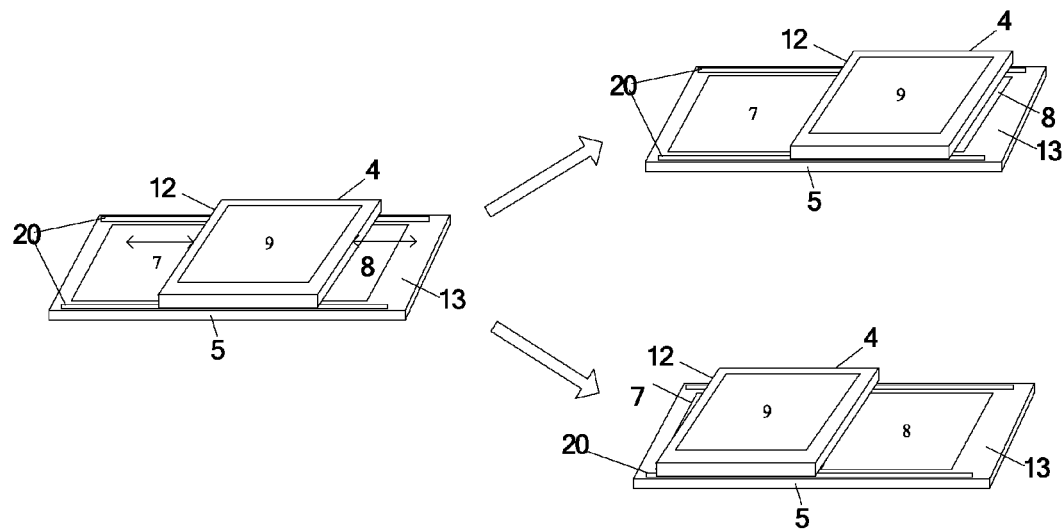

In a case that first component 4 is connected to the second component 5 through a slide rail 20, as shown in FIG. 6*g*, the slide rail is disposed between the second surface 16 of the first component 4 and the first surface 13 of the second component 5, and does not overlap the first viewable area 7 and the second viewable area 8, and as shown in FIG. 6*h*. The first component 4 is able to slide in a direction parallel to the second component 5, to block the second viewable area 8 or the first viewable area 7. Therefore, in a case that the first component 4 blocks the second viewable area 8, the first viewable area 7 is in the relatively viewable state. In this case, in response to the operation data collected by the input device 3, the processing device 11 controls the first display device 1 to switch from displaying the first content to displaying the third content. In a case that the first component 4 blocks the first viewable area 7, the first viewable area 7 is in the relatively unviewable state, in this case, in response to the operation data collected by the input device 3, the processing device 11 controls the second display device 2 to switch from displaying the second content to displaying the fourth content.

In addition, an electronic device is provided according to a third embodiment of the disclosure, in a case that the collection area 9 is in a relatively viewable state, other implementations according to the embodiment are as follows.

In a case that there is the first relative position relation between the first component 4 and the second component 5, a first distance between the collection area 9 and the first viewable area 7 is smaller than a second distance between the collection area 9 and the second viewable area 8. In this case, in response to the operation data collected by the input device 3, the processing device 11 controls the first display device 1 to switch from displaying the first content to displaying the third content. Accordingly, in a case that there is the second relative position relation between the first component 4 and the second component 5, the first distance is greater than the second distance, in this case, in response to the operation data collected by the input device 3, the processing device 11 controls the second display device 2 to switch from displaying the second content to displaying the fourth content.

Figure 7A:
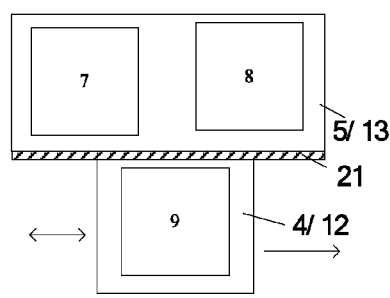
FIGS. 7a-7g are respective schematic structural diagrams for an electronic device according to a third embodiment of the disclosure.
Figure 7B:
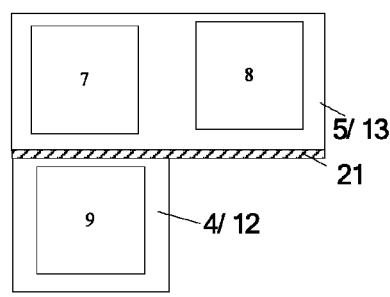
Figure 7C:
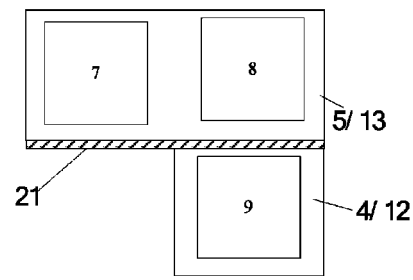

For example, as shown in FIG. 6*a*, the collection area 9 is located on the first surface 12 of the first component 4. As shown in FIG. 6*b*, the first viewable area 7 and the second viewable area 8 are located on the first surface 13 of the second component 5, and do not overlap each other, where the first surface of the first component is parallel or approximately parallel to the first surface of the second component. Transparencies of the collection area 9 and the first component 4 are smaller than a certain threshold, to make the collection area 9 and the first component 4 block the display content. As shown in FIG. 7*a*, the first component 4 may be connected to the second component 5 through a slide rail 21 disposed at an edge of the second component 5, and the first component 4 is able to slide left and right along the slide rail 21, so that the distance between the collection area 9 and the first viewable area 7 and the distance between the collection area 9 and the second viewable area 8 may change. Therefore, in a case that the first component 4 slides to a position as shown in FIG. 7*b*, the first distance between the collection area 9 and the first viewable area 7 is smaller than the second distance between the collection area 9 and the second viewable area 8, and in response to the operation data collected by the input device 3, the processing device 11 controls the first display device 1 to switch from displaying the first content to displaying the third content; and in a case that the first component 4 slides to a position at a right side of the second component 5 as shown in FIG. 7*c*, the first distance is greater than the second distance, and in response to the operation data collected by the input device 3, the processing device 11 controls the second display device 2 to switch from displaying the second content to displaying the fourth content.

Figure 7D:
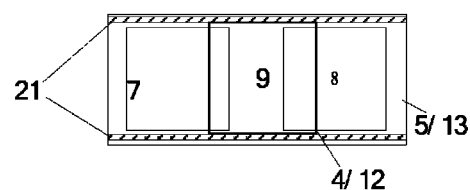
Figure 7E:
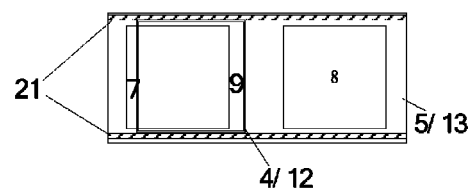
Figure 7F:
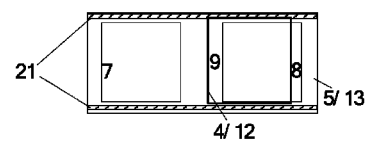

In a case that transparencies of the collection area 9 and the first component 4 are both greater than the first preset threshold, the user is able to view display content through the collection area 9. In this case, as shown in FIG. 7d, the slide rail 21 may be disposed between the second surface 16 of the first component 4 and the first surface 13 of the second component 5, and does not overlap the first viewable area 7 and the second viewable area 8. Thus the first component 4 is able to slide left and right along the slide rail 21, to change the distance between the collection area 9 and the first viewable area 7 and the distance between the collection area 9 and the second viewable area 8. In a case that the first component 4 slides to a position at a left side of the second component 5 as shown in FIG. 7e, the first distance between the collection area 9 and the first viewable area 7 is smaller than the second distance between the collection area 9 and the second viewable area 8, the collection area 9 of the first component 4 overlaps the first viewable area 7 of the second component 5 in a direction vertical to a plane where the first viewable area 7 locates or a plane where the collection area 9 locates, the first viewable area 7 is in the relatively viewable state through the collection area 9, and in response to the operation data collected by the input device 3, the processing device 11 controls the first display device 1 to switch from displaying the first content to displaying the third content; and in a case that the first component 4 slides to a position at a right side of the second component 5 as shown in FIG. 7f, the first distance is greater than the second distance, the collection area 9 of the first component 4 overlaps the second viewable area 8 of the second component 5, the second viewable area 8 is in the relatively viewable state, and in response to the operation data collected by the input device 3 the processing device 11 controls the second display device 2 to switch from displaying the second content to displaying the fourth content.

Figure 7G:
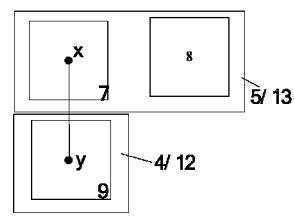

It is should be noted that the distance according to the embodiment may be understood as a distance between centers of areas, For example, the first distance is a distance between a center x of the collection area 9 and a center y of the first viewable area 7, as shown in FIG. 7g.

In addition, an electronic device is further provided according to a fourth embodiment of the disclosure. In this embodiment, as shown in FIG. 6a, the collection area 9 is located on a first surface 12 of the first component 4; as shown in FIG. 6b, the first viewable area 7 and the second viewable area 8 are located on a first surface 13 of the second component 5 and do not overlap each other; as shown in FIG. 4c, the first surface 12 of the first component 4 is parallel or approximately parallel to the first surface 13 of the second component 5; and as shown in FIG. 6g or FIG. 7d, the first surface 12 of the first component 4 overlaps the first surface 13 of the second component 5 in a direction vertical to the first surface 13 of the second component 5.

A first relative position relation is that the first surface 12 of the first component 4 completely overlaps a first area of the first surface 13 of the second component 5; and the second relative position relation is that the first surface 12 of the first component 4 completely overlaps a second area of the first surface 13 of the second component 5.

It is should be noted that the first area may be the entire first viewable area 7 or nearly the entire first viewable area 7. Accordingly, transparencies of the collection area 9 and the first component 4 are greater than a first preset threshold, that is, the user is able to view the first viewable area 7 through the collection area 9, i.e., the first viewable area 7 is in the relatively viewable state. In this case, in response to the operation data collected by the input device 3, the processing device 11 controls the first display device 1 to switch from displaying the first content to displaying the third content. In a case that the first area is the entire first viewable area 7 or nearly the entire first viewable area 7, the second area is the entire second viewable area 8 or nearly the entire second viewable area 8.

It is should be noted that the first area may be the entire second viewable area 8 or nearly the second viewable area 8. Accordingly, transparencies of the collection area 9 and the first component 4 are smaller than the first preset threshold. In this case, the first viewable area 7 is in the relatively unviewable state, the second viewable area 8 is in the relatively viewable state. In this case, in response to the operation data collected by the input device 3, the processing device 11 controls the second display device 2 to switch from displaying the second content to displaying the fourth content. In a case that the first area is the entire second viewable area 8 or nearly the second viewable area 8, the second area is the entire first viewable area 7 or nearly the entire first viewable area 7.

The first component 4 may be connected to the second component 5 through a slide rail, and the collection area 9 can move, with the first component 4, left and right relative to the first viewable area 7 of the second component 5, thereby the first component 4 overlaps the first area or the second area of the first surface 13 of the second component 5.

In an implementation, an electronic device is further provided according to a fifth embodiment of the disclosure. According to the embodiment, in a case that there is a first relative position relation between the first component 4 and the second component 5, a plane where the first viewable area 7 locates is parallel to a plane where the second viewable area 8 locates; and in a case that there is a second relative position relation between the first component 4 and the second component 5, the plane where the first viewable area 7 locates is parallel to the plane where the second viewable area 8 locates. In other words, as shown in drawings such as FIG. 4c, FIG. 5c, FIG. 5d and FIG. 6c, the plane where the first viewable area 7 locates is constantly parallel to the plane where the second viewable area 8 locates, and technical solutions thereof may refer to corresponding content in the foregoing, and may not be described herein.

In an implementation, in the electronic device, an imaging mechanism in which the first display device 1 displays the first content onto the first viewable area 7 is different from an image mechanism in which the second display device 2 displays the second content onto the second viewable area 8. For example, the first display device 1 displays a visual image of the first content onto the first viewable area 7, and the second display device 2 display a real image of the second content onto the second viewable area 8. Accordingly, the first display device 1 has following implementation structures.

Figure 8:
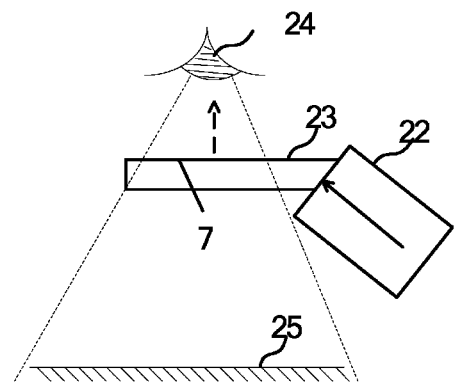
FIG. 8 is a structural diagram of a part of an electronic device according to a sixth embodiment of the disclosure.

FIG. 8 is a schematic diagram of an implementation structure for the first display device 1 of the electronic device according the sixth embodiment of the disclosure. The first display device 1 may include a display component 22 and an optical path switching component 23.

The display component 22 is configured to output original light from the first content, as the light represented by a solid line shown in FIG. 8.

Where the display component may be a self-luminous display component such as an organic light emitting diode display device, or a backlight display component such as a liquid crystal display device; and the optical path switching component 23 is configured to receive the original light from the first content through the display component 22, and switch the original light from the first content, to form a visual image of the first content, where the switched light is emitted from the first viewable area 7 of the optical path switching component 23.

The size of the visual image is larger than that of the display module.

In an actual implementation, the optical path switching component 23 may include a lens group configured for collimation and image magnification, and a waveguide slice or a flexible waveguide configured to switch the direction of light. According to the embodiment, the first viewable area 7 is a part of the optical path switching component 23, and is configured to emit the switched light. In addition, as a dotted arrow shown in FIG. 8, a viewer at a first specific position 24 may view the visual image of the first content. Especially, through the optical path switching component 23, the visual image of the first content may be formed at a second specific position according to a design requirement. Therefore, as shown in FIG. 8, the viewer at the first specific position 24 may view the visual image of the first content formed at the second specific position 25 through the first viewable area 7, and the second specific position may at either side of the optical path switching component 23.

Hence, the first display device 1 as shown in FIG. 8 may not be limited to the size of the electronic device provided with the first display device 1, and image or video display with larger size and higher resolution may be provided to the viewer at the first specific position 24 according to the design requirement.

Figure 9:
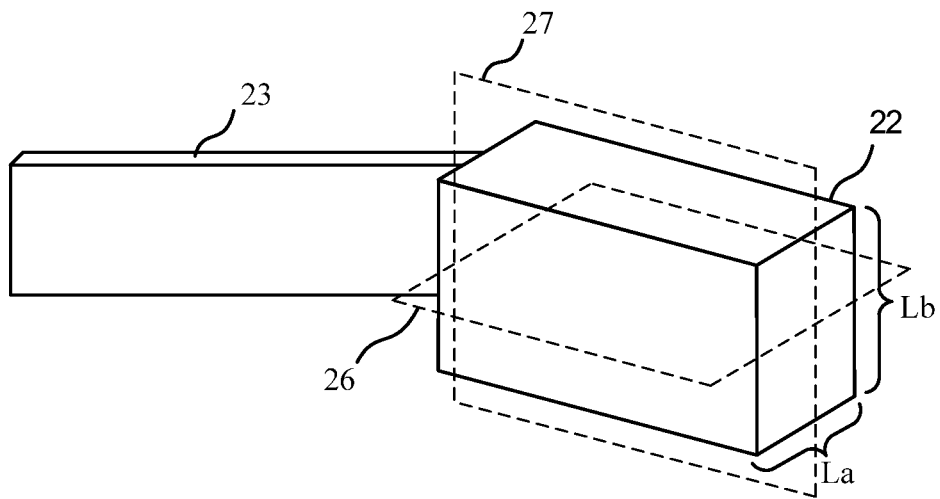
FIGS. 9-14, 15a-15d are respective schematic structural diagrams for other part of the electronic device according to the sixth embodiment of the disclosure.

As shown in FIG. 9, light for forming the first content which are generated in the display component 22 are in a first plane 26, and light for forming the visual image of the first content which are emitted from the optical path switching component 23 are in a second plane 27. There is a first angle between the first plane 26 and the second plane 27. According to the embodiment, the first angle is 90 degrees. In this case, a first size La of the display component 22 in a direction vertical to the first plane 26 is smaller than a second size Lb of the display component 22 in a direction parallel to the first surface. In a case that the electronic device provided with the first display device 1 is a wearable electronic device, for example, the electronic device is a smart glasses, the display component 22 is disposed in a frame (i.e., a leg of the glasses) at a side of the smart glasses. With such configuration, the frame provided with the display component 22 is thinner. Similarly, in a case that the electronic device is a smart watch, the display component 22 is disposed in a watch scrap at a side of the smart watch. With such configuration, the watch scrap provided with the display component 22 is thinner. Therefore, the display component 22 is implemented with a reduced thickness in a specific direction, thereby reducing a thickness of the display device 1 provided with the display component 22 in a corresponding direction.

Figure 10:
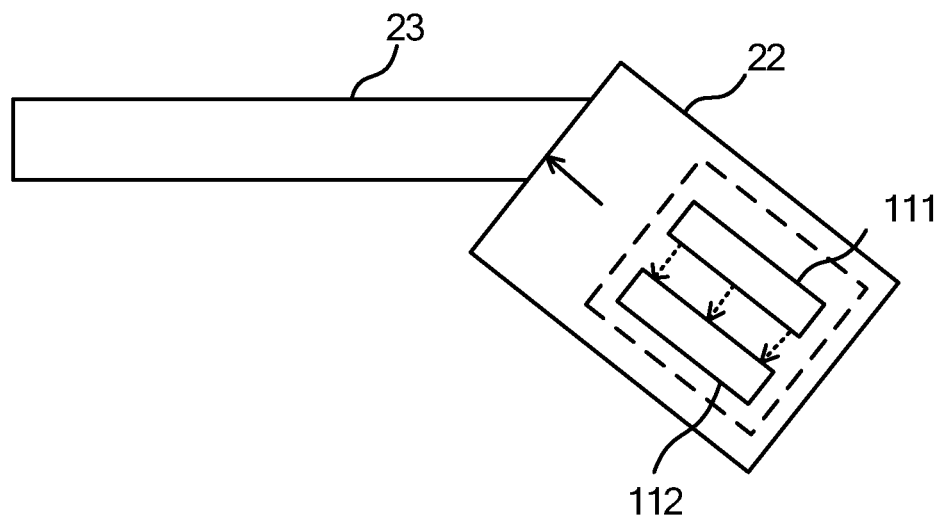

As shown in FIG. 10, the display component 22 includes a light emitting unit 111 and a display unit 112. The light emitting unit 111 is configured to generate and emit backlight (light represented by dotted arrows as shown in FIG. 10), and the backlight are located on the first plane as shown in FIG. 9. The display unit 112 is disposed in an irradiated area of the backlights, and is configured to generate the original light (light represented by solid arrows as shown in FIG. 10) corresponding to the first content according to the first content.

Figure 11:
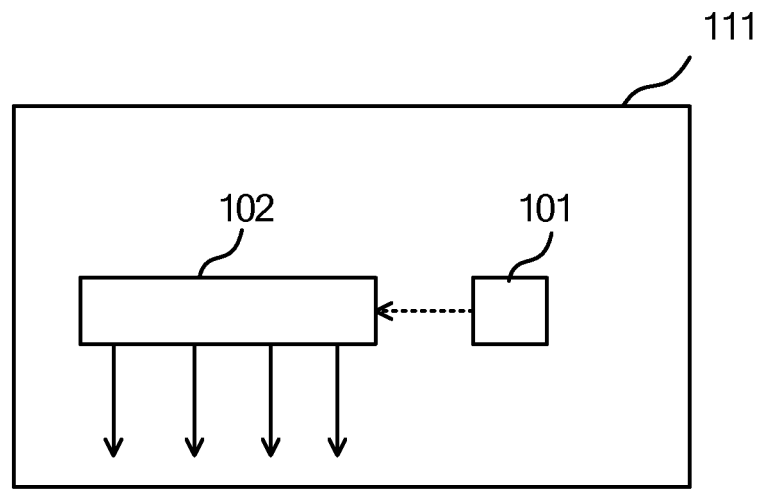

As shown in FIG. 11, the light emitting unit 111 includes a light source subunit 101 and a light guide subunit 102. The light source subunit 101 is configured to emit light (light represented by dotted arrows as shown in FIG. 4) in the second direction, the light guide subunit 102 is disposed in the irradiation area of the light, and the light form backlights (light represented by solid arrows as shown in FIG. 11) after passing through the light guide subunit 102. That is, the light guide subunit 102 switches the light emitted by the light source subunit 101 used as a single point light source into the flat backlight, where the flat backlight is located on the first plane as shown in FIG. 9. The light source subunit 101 may be a light emitting diode (LED), or an optical film. A thickness of the light emitting unit 111 is limited to be smaller than or equal to a value such as 1.5 mm, and an angle for emitting the flat backlight switched by the light guide subunit 102 is limited to be smaller than or equal to 14 degrees, i.e., an angle between the direction for emitting the backlight switched by the light guide subunit 102 and the second direction is smaller than or equal to 7 degrees. Therefore, the directions for emitting the flat backlight switched by the light guide subunit 102 may be approximately regarded as one direction (i.e., the second direction), thereby avoiding generating stray lights which are emitted in directions different from the second direction.

Figure 12:
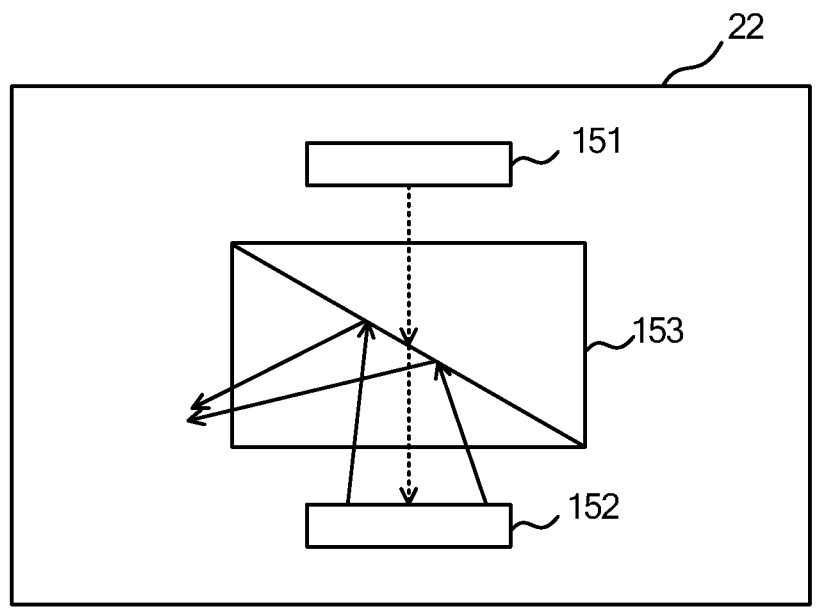

As shown in FIG. 12, the display component 22 may includes a light emitting unit 151, a display unit 152 and a beam splitting unit 153. The light emitting unit 151 is configured to emit backlight (light represented by a dotted arrow as shown in FIG. 12). In view of above, the light emitting unit 151 may be a light emitting unit for the flat backlight described referring to FIG. 10 and FIG. 11. The backlight from the light emitting unit 151 passes through the beam splitting unit 153. According to the embodiment, the beam splitting unit 153 may be a polarization beam splitter (PBS). P-polarized backlight emitted by the light emitting unit 151 passes through the PBS used as the beam splitting unit 153 to irradiate display unit 152. The display unit 152 is disposed in the irradiation area of the flat backlight passing through the beam splitting unit 153, and is configured to generate the original light (light represented by solid arrows as shown in FIG. 12) corresponding to the first content. Furthermore, the original light (modulated into S-polarized lights) corresponding to the first content which come from the light emitting unit 151 are reflected in the PBS used as the beam splitting unit 153, and then is guided to the optical path switching component 23 by the beam splitting unit 153.

Figure 13:
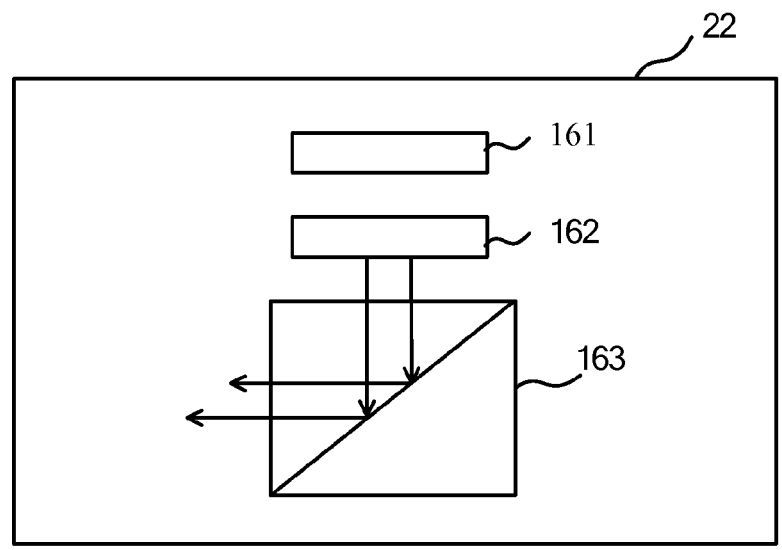

As shown in FIG. 13, the display component 22 may include a light emitting unit 161, a display unit 162 and a beam splitting unit 163. The display unit 162 is configured to generate a display signal corresponding to the first content. The light emitting unit 61 is configured to generate original light corresponding to the first content based on the display signal. That is, the light emitting unit 161 and the display unit 162 of the first display device 1 according to the embodiment may be implemented as a self-luminous organic light emitting diode (OLED) display device, the display unit 162 is a control unit configured to generate a display driving signal according to the first content to be displayed, and the light emitting unit 161 is a self-luminous layer configured to emit light and display based on the received display driving signal. Similar to the case as shown in FIG. 12, the beam splitting unit 163 is configured to guide the original light corresponding to the first content which comes from the light emitting unit 161 to the optical path switching component 23. According to the embodiment, the beam splitting unit 163 is a PBS.

Therefore, in the display component 22 of the first display device 1, the display unit and the light emitting unit are integratedly disposed at one side of the beam splitting unit, so that a size of the display device in a direction that the display device generates the original light is smaller than that in a case (referring to the case as shown in FIG. 12) that the display unit and the light emitting unit are integratedly disposed at two sides of the beam splitting unit respectively.

Figure 14:
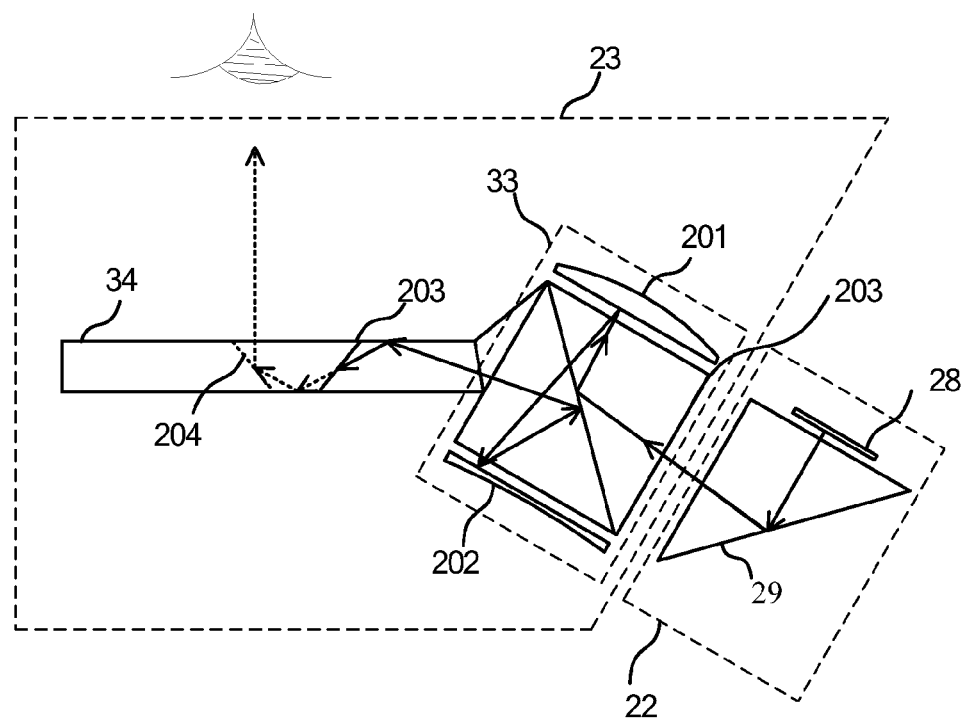
Figure 15A:
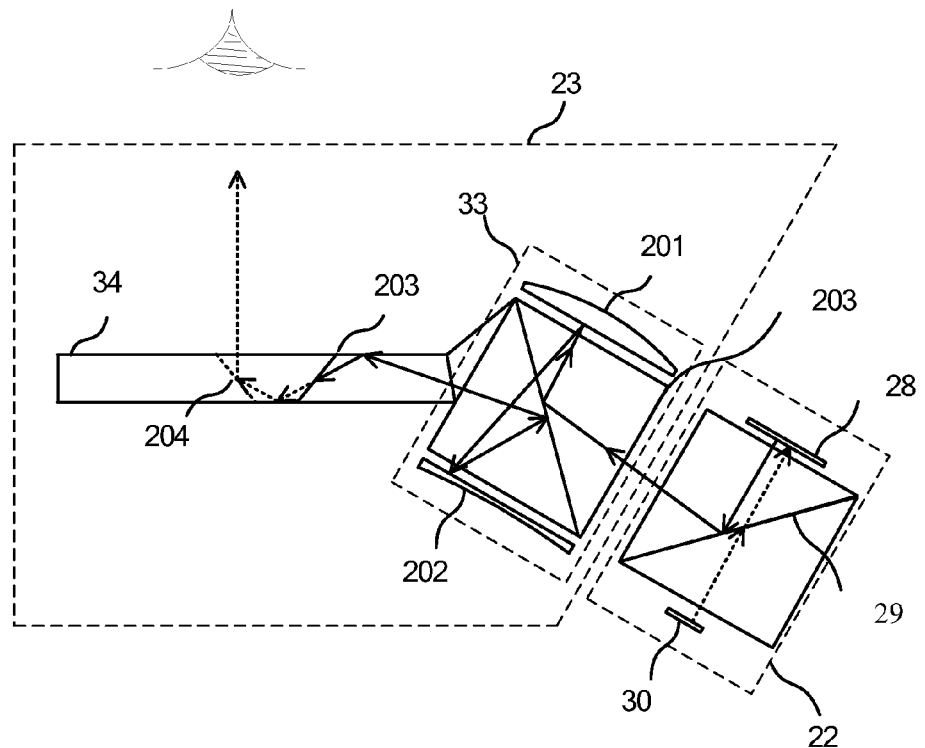

FIG. 14 and FIG. 15*a* show structural diagrams of the first display device 1. The display component 22 includes a display unit 28 and a beam splitting unit 29 (as shown in FIG. 14), and the display component of this structure is described in the foregoing with reference to FIG. 13. Alternatively, the display component 22 includes a light emitting unit 30, a display unit 31 and a beam splitting unit 32 (as shown in FIG. 15*a*), and the display component of this structure is described in the foregoing with reference to FIG. 12. The repetitive descriptions for the display module 22 and the light path are omitted herein.

As shown in FIG. 14 and FIG. 15*a*, the optical path switching module 23 further includes a conllimation unit 33 and a waveguide unit 34.

The collimation unit 33 is configured to collimate the original light corresponding to the first content which comes from the display component 22 into collimation light corresponding to the first content and emit the collimation light into the waveguide unit 34. The collimation unit 33 includes a first collimation subunit 201 and a second collimation subunit 202 opposite to the first collimation subunit 201, and a polarization beam splitting subunit 203 between the first collimation subunit 201 and the second collimation subunit 202. The light corresponding to the first content which comes from the second collimation subunit 202 is reflected by the polarization beam splitting subunit 203 to the first collimation subunit 201, is collimated by the first collimation subunit 201 and the second collimation subunit 202, and then is emitted as collimation lights corresponding to the first content by the polarization beam splitting subunit 203. The waveguide unit 34 guides the collimation light corresponding to the first content from the collimation unit 33 to the specific position, where the collimation light corresponding to the first content is configured to form a visual image corresponding to the first content. According to the embodiment, the first collimation subunit 201 and the second collimation subunit 202 may be lenses or lens groups designed as needed. The size of the visual image corresponding to the first content may be adjusted by adjusting relative positions for the lens or the lens groups of the first collimation subunit 201 and the second collimation subunit 202

In addition, as shown in FIG. 14 and FIG. 15, the waveguide unit 34 further includes a first reflecting subunit 203 and/or a second reflecting subunit 204. The collimation light corresponding to the first content which comes from the collimation unit 33 may be controlled to be emitted to the specific position, by disposing positions and angles of the first reflecting subunit 203 and/or the second reflecting subunit 204. In a first case, the collimation unit 33 and the display component 22 are located at a first side of a plane where the waveguide unit 34 locates, and in a case that the first reflecting subunit 203 as shown in FIGS. 14*a* and 15*a* is disposed, the light may be emitted to the first side. In a second case, in a case that the second reflecting subunit 204 as shown in FIGS. 14*a* and 15*a* is disposed, the collimation light corresponding to the first content may be emitted to a second side of the plane where the waveguide unit 34 locates, and the first side and the second side are opposite to each other relative to the plane where the waveguide unit 34 locates. In a case that the display device, for example, is applied to a head-mounted electronic device, configuration way for the first case may be used, so that the collimation lights corresponding to the first content are emitted to the first side, i.e., the collimation lights are emitted to eyes of a user wearing the head-mounted electronic device. In a case that the display device, for example, is applied to a wrist-strap electronic device, configuration way for the first case may be used, so that the collimation light corresponding to the first content are emitted to the second side, i.e., the collimation light are emitted to eyes of a user wearing and watching the wrist-strap electronic device. Further description may be made in the following. The direction that the display device emits light may be configured as needed. For example, rotations for the first reflecting subunit 203 and/or the second reflecting subunit 204 may be controlled, to control the directions that the first reflecting subunit 203 and/or the second reflecting subunit 204 emit light, thereby implementing switch for the two display directions of the display device.

In the first display device 1 according to the embodiment, a folded optical imaging path between the first collimation subunit 201 and the second collimation subunit 202 is implemented by using the polarization beam splitting subunit 203 of the collimation unit 33, thereby reducing the overall size of the display device.

Figure 15B:
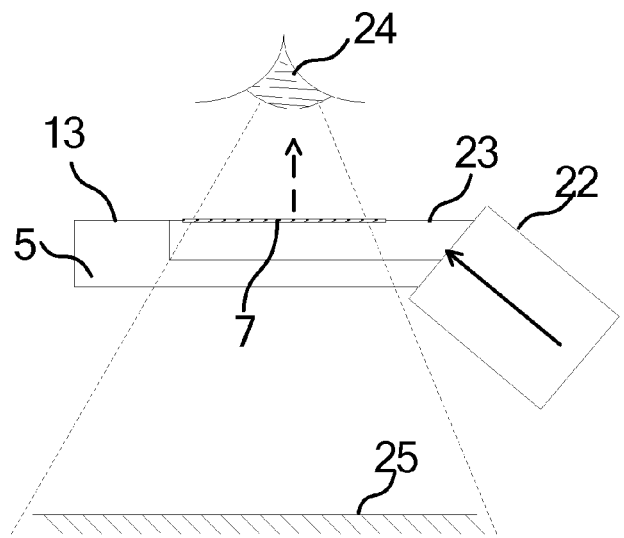
Figure 15C:
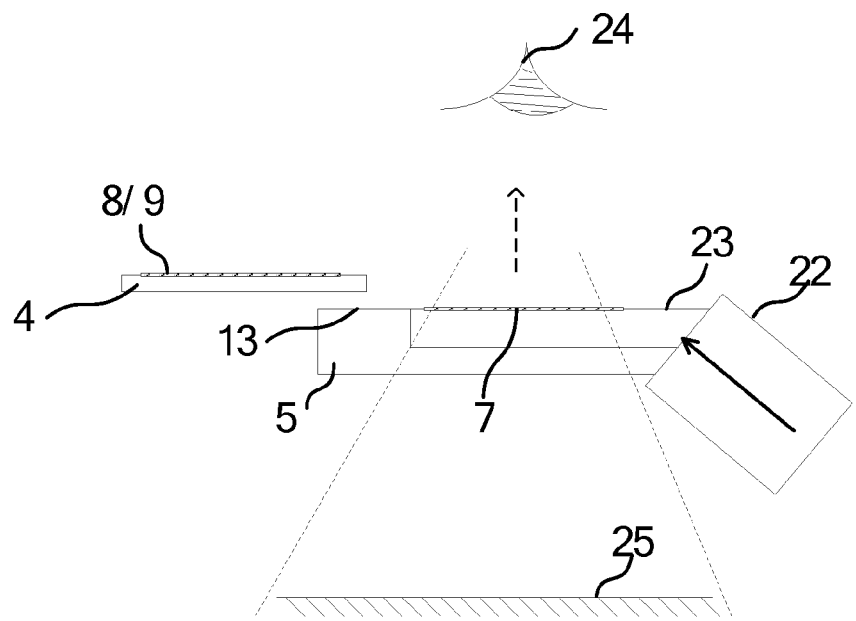
Figure 15D:
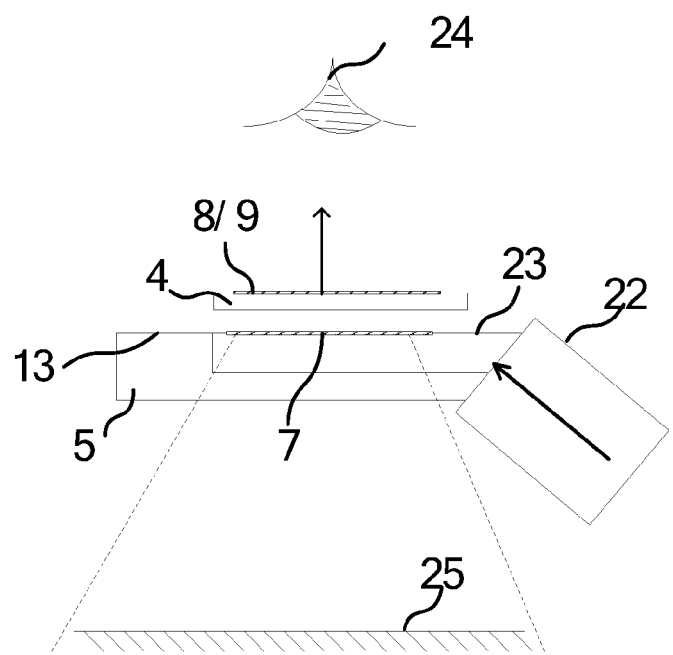

In conjunction with embodiments as shown in FIGS. 4*a* to 4*n*, the first viewable area 7 of the optical path switching component 23 in the first display device 1 is disposed on the first surface 13 of the second component 5, the second viewable area 8 and the collection area 9 are disposed on the first surface 12 of the first component 4, and the optical path switching component 23 performs the optical path switching on the original light corresponding to the first content which are output by the display component 22 of the optical path switching component 23, to form a visual image corresponding to the first content at the second specific position, where the second specific position has a certain position relation with the first viewable area 7. As shown in FIG. 15*b*, if condition is permitted, the viewer at the first specific position 24 may view the visual image for the first content at the second specific position through the first viewable area 7. Therefore, in the direction vertical to the plane where the first viewable area 7 locates or the plane where the second viewable area 8 locates, the second viewable area of the first component 4 overlaps or does not overlap the first viewable area of the second component 5, and in a case that the second viewable area 8 does not overlap the first viewable area 7, the first viewable area 7 is in the relatively viewable state, so that as shown in FIG. 15*b*, the viewer at the first specific position 24 may view the visual image corresponding to the first content at the second specific position 25. In this case in response to the operation data collected by the input device 3, the processing device 11 controls the first display device 1 to switch from displaying the first content to displaying the third content. Accordingly, in case that the first viewable area 7 overlaps the second viewable area 8, the first viewable area 7 is in the relatively unviewable state, and the viewer at the first specific position 24 is not able to view the visual image corresponding to the first content at the second specific position 25 through the first viewable area 7, and is only able to view the real image (solid line) on the second viewable area 8, as shown in FIG. 15*d*. In this case, the second viewable area 8 is in the relatively viewable state, and in response to the operation data collected by the input device 3, the processing device 11 controls the second display device 2 to switch from displaying the second content to displaying the fourth content.

An electronic device is further provided according to a seventh embodiment of the disclosure. According to the embodiment, the electronic device includes a main body device 35 and a fixing device 36.

The fixing device 36 at least has a fixing state, and is able to be used as a part of or an entire annular space, or, the fixing device 36 may be a part of an entire approximate annular space satisfying a first preset condition, where the first preset condition may be that a central angle corresponding to the fixing device 36 is greater or equal to a preset angle, such as 300 degrees. The annular space or the approximate annular space is capable of relatively fixing the main body device 35 on the periphery of the cylinder satisfying a second preset condition, where the first component 4 and the second component 5 are disposed in the main body device 35.

Figure 16:
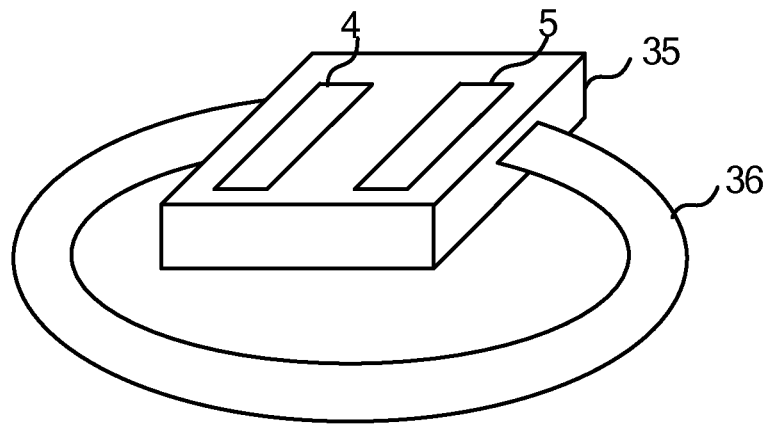
FIGS. 16-19 are respective schematic structural diagrams for an electronic device according to a seventh embodiment of the disclosure.
Figure 17:
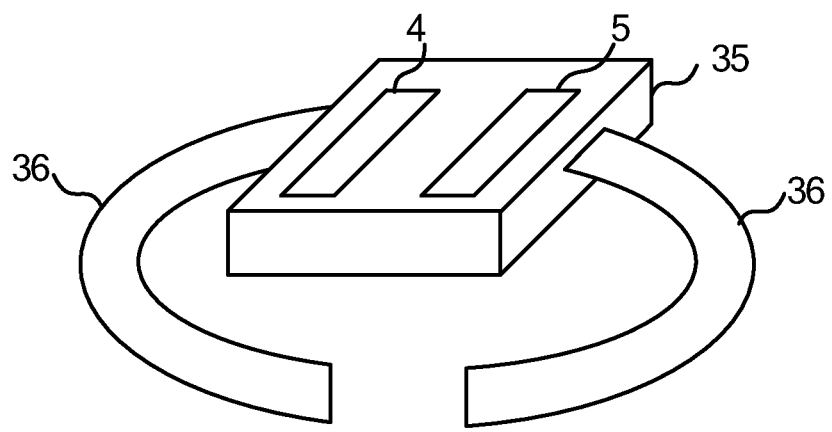

FIG. 16 and FIG. 17 show two fixing states in which the fixing device 36 is connected to the main body device 35. In the first fixing state, as shown in FIG. 16, the fixing device 36 and the main body device 35 form a closed annular space, where the fixing device 36 and the main body device 35 form respective portions of the annular space. In the second fixing state, as shown in FIG. 17, the fixing device 36 and the main body device 35 form an approximate annular space with a small opening, and the fixing device 36 and the main body device 35 form respective portions of the annular space. For example, the fixing device 36 is similar to a watch scrap in a watch, the main body device 35 is similar to a dial in the watch, the annular space or the approximate annular space formed by the fixing device 36 and the main body device 35 may be disposed around the cylinder such as a wrist, and a diameter of the annular space or the approximate annular space is greater than that of the cylinder such as the wrist, and is smaller than that of a terminal portion of the cylinder such as a first of a user.

Figure 18:
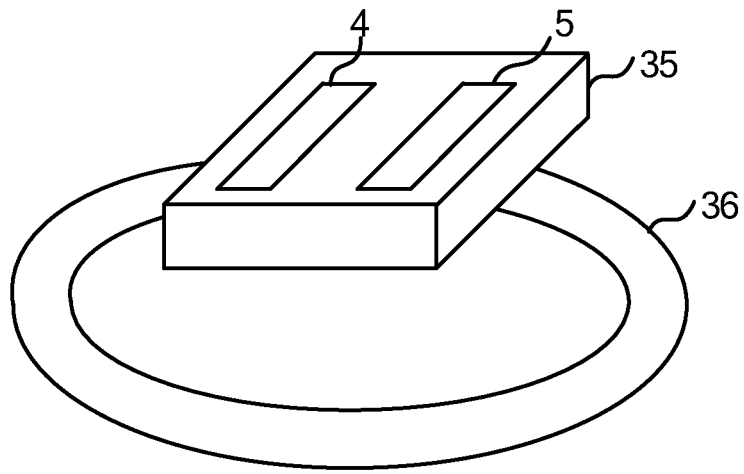
Figure 19:
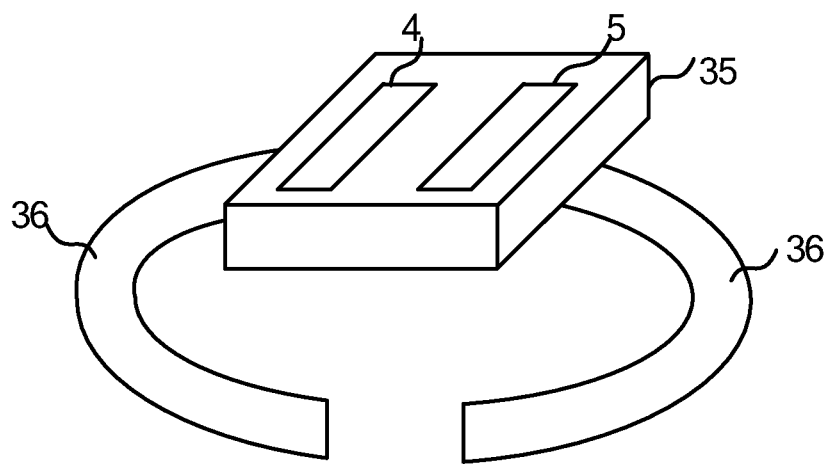

In addition, as shown in FIG. 18 and FIG. 19, the annular space or the approximate annular space may be formed only by the fixing device 36, and the main body device 35 may be disposed on the fixing device 36, i.e., the main body device 35 is attached to the fixing device 36 in a surface-touch way, so that the fixing device 36 independently forms the annular space as shown in FIG. 18 or the approximate annular space as shown in FIG. 19 which is configured to surround the cylinder. The fixing device 36 is provided with a fixing mechanism such as an agraffe, a snapper or a zipper, so that the annular space or the approximate annular space formed by the fixing device 36 is able to be fixed around the cylinder.

Furthermore, as shown in FIG. 16 to FIG. 19, the main body device 35 is provided with the first component 4 and the second component 5, i.e., the first viewable area 7, the second viewable area 8 and the collection area 9 are located on the main body device 35. Combined with the structures of the optical path switching component and the display component in the first display device 1 which are described in the foregoing, it is may be understood that a portion of the optical path switching component, for example, the first viewable area 7, is disposed in the main body device 35, and the optical path switching component switches original light and emits the switched light through the first viewable area 7, thus a viewer at a first specific position may view the visual image corresponding to the first content through the first viewable area 7.

It is should be noted that, other components such as the first display device 1, the second display device 2, the input device 3 and the processing device 11 may be arbitrarily disposed in the main body device 35 or the fixing device 36, and the detection device 10 may be disposed on the main body device 35 and is connected to the first component 4 and the second component 5 to determine the relative position relation for the two components.

In a case that there is a first relative position relation between the first component 4 and the second component 5, in response to the operation data collected by the input device 3, the processing device 11 controls the first display device 1 to switch from displaying the first content to displaying the third content; and in a case that there is a second relative position relation between the first component 4 and the main body device 35, in response to the operation data collected by the input device 3, the processing device 11 controls the second display device 2 to switch from displaying the second content to displaying the fourth content.

Implementation structures for the first component 4 and the second component 5 may refer to the foregoing embodiments and are not described herein.

Figure 20:
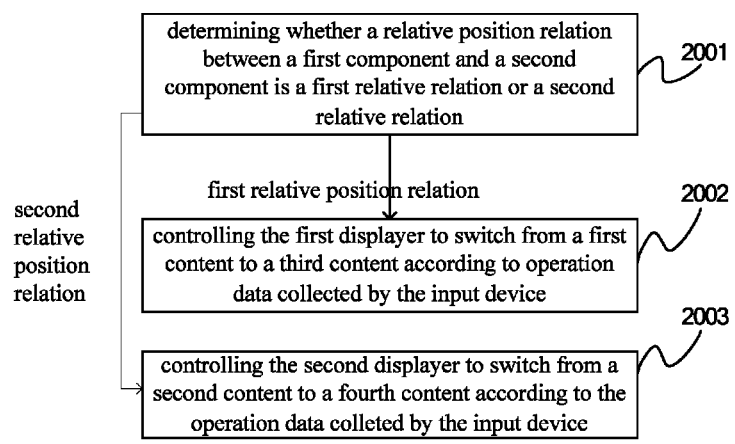
FIG. 20 is a flow chart of a processing method according an eighth embodiment.

FIG. 20 is a flow chart for a processing method according to an eighth embodiment according to the disclosure. The method may include following steps.

Step 2001 includes: determining whether there is a first relative position relation or a second relative position relation between a first component and a second component.

The first component is connected to the second component through a connector, and the first relative position relation or the second relative position relation exits between the first component and the second component. One or two of the first viewable area of the first display device, the second viewable area of the second display device and the collection area of the input device are located on the first component, and rest areas of the first viewable area, the second viewable area and the collection area are located on the second component.

It is should be noted that structures of the electronic device according to the embodiment may refer to implementation structures in the foregoing, and are not described herein In the step 2001, a detection device in the electronic device may be used to detect and determine the relative position relation between the first component and the second component.

Step 2002 includes: controlling the first display device to switch from displaying a first content to displaying a third content according to operation data collected by the input device, in a case that there is the first relative position relation between the first component and the second component.

Step 2003 includes: controlling the second display device to switch from displaying a second content to displaying a fourth content according to the operation data collected by the input device, in a case that there is the second relative position relation between the first component and the second component.

The method according to the embodiment may be executed in the processing device according the foregoing embodiments, to control switch for input devices of the two display devices in the electronic device.

Figure 21:
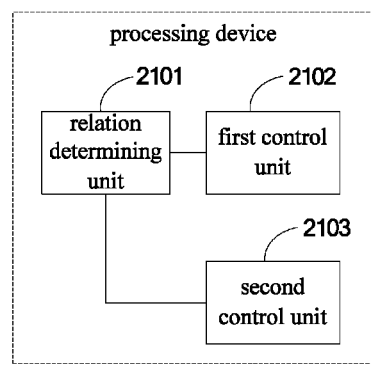
FIG. 21 is a schematic structural diagram of a processing device according a ninth embodiment of the disclosure.

FIG. 21 is a schematic structural diagram of a processing device according to a ninth embodiment according to the disclosure. The device may include following units a relation determining unit 2101, a first control unit 2102 and a second control unit 2103.

The relation determining unit 2101 is configured to determine whether there is a first relative position relation or a second relative position relation between the first component and the second component; trigger the first control unit 2102, in a case that there is the first relative position relation between the first component and the second component; trigger the second control unit 2103, in a case that there is the second relative position relation between the first component and the second component;

The first control unit 2102 is configured to control the first display device to switch from displaying a first content to displaying a third content according to operation data collected by the input device; and The second control unit 2103 is configured to control the second display device to switch from displaying a second content to displaying a fourth content according to the operation data collected by the input device.

It is should be noted that the processing device according to the embodiment may be a program execution module disposed in a processor of the electronic device, configured to control switch between input devices of the two display devices in the electronic device.

It should be illustrated that the embodiments of the present disclosure are described in a progressive manner, and each embodiment places emphasis on the difference from other embodiments, therefore, one embodiment can refer to other embodiments for the same or similar parts.

Furthermore, terms "include", "comprise" or any other variations are intended to cover non-exclusive "include", so that an object or a device including a series of factors not only include the factors, but also include other factors not explicitly listed, or also include inherent factors of the object or the device. Without more limitation, a factor defined in a sentence "include one . . . " does not exclude a case that there is also another same factor in the object or the device including the described factor.

An electronic device, a processing method and a device are described in detail according to the disclosure. The principle and embodiments of the disclosure are illustrated through using specific cases, and the illustrations of the embodiments are only to help understanding of the method and the core idea of the disclosure. Meanwhile, for those skilled in the art, some modifications may be made on embodiments and application scope based on the spirit of the disclosure. In conclusion, the content according to the specification should not be understood as a limitation of the disclosure.

What is claimed is:

1. An electronic device, comprising:
a first display device, configured to display a first content in a first viewable area, wherein the first display device is a first hardware device that outputs light towards a first viewer;
a second display device, configured to display a second content in a second viewable area, wherein the second display device is a second hardware device that outputs light toward a second viewer;
one input device;
a first component and a second component, wherein the first component and the second component are connected to each other through a connector, there are a first relative position relation or a second relative position relation between the first component and the second component through the connector, one or two of the first viewable area, the second viewable area, and a collection area of the one input device are located on the first component, and other areas of the first viewable area, the second viewable area, and the collection area are located on the second component;
a detection device configured to determine whether the first relative position relation or the second relative position relation exists between the first component and the second component; and
a processing device configured to:
control the first display device in response to the one input device to switch from displaying the first content to displaying a third content, in a case that there is the first relative position relation between the first component and the second component; and
control the second display device in response to the one input device to switch from displaying the second content to displaying a fourth content, in a case that there is the second relative position relation between the first component and the second component,
wherein the components of the electronic device are arranged in one of a first arrangement, a second arrangement, and a third arrangement,
wherein in a case that the components of the electronic device are arranged in the first arrangement:
the collection area is in a relatively viewable state,
in a case that there is the first relative position relation between the first component and the second component, the first viewable area is in the relatively viewable state,
in a case that there is the second relative position relation between the first component and the second component, the first viewable area is in a relatively unviewable state,
the collection area is located on a first surface of the first component,
the first viewable area and the second viewable area are located on a first surface of the second component,
the first viewable area does not overlap the second viewable area,
the first surface of the first component is parallel or approximately parallel to the first surface of the second component,
the first relative position relation includes the collection area of the first component overlapping the second viewable area of the second component in a direction vertical to a plane where the first viewable area locates or a plane where the collection area locates, and
the second relative position relation includes the collection area of the first component overlapping the first viewable area of the second component in the direction vertical to the plane where the first viewable area locates or the plane where the collection area locates,
wherein in a case that the components of the electronic device are arranged in the second arrangement:
the collection area is in a relatively viewable state,
in a case that there is the first relative position relation between the first component and the second component, a first distance between the collection area and the first viewable area is smaller than a second distance between the collection area and the second viewable area, and in a case that there is the second relative position relation between the first component and the second component, the first distance is greater than the second distance, and wherein in a case that the components of the electronic device are arranged in the third arrangement:
the collection area is located on a first surface of the first component,
the first viewable area and the second viewable area are located on a first surface of the second component and do not overlap each other,
the first surface of the first component is parallel or approximately parallel to the first surface of the second component,
the first surface of the first component overlaps the first surface of the second component in the direction vertical to the first surface of the second component,
the first relative position relation includes the first surface of the first component completely overlapping a first region of the first surface of the second component, and
the second relative position relation includes the first surface of the first component completely overlapping a second region of the first surface of the second component.

2. The electronic device according to claim 1, wherein in the case that the components of the electronic device are arranged in the second arrangement:
transparencies for the collection area and the first component are both greater than a preset threshold, the collection area is located on the first surface of the first component, the first viewable area and the second viewable area are located on the first surface of the second component, the first viewable area does not overlap the second viewable area, and the first surface of the first component is approximately parallel or parallel to the first surface of the second component;
the first relative position relation is that in the direction vertical to the plane where the first viewable area locates or the plane where the collection area locates, the collection area of the first component overlaps the first viewable area of the second component; and
the second relative position relation is that in the direction vertical to the plane where the first viewable area locates or the plane where the collection area locates, the collection area of the first component overlaps the second viewable area of the second component.

3. The electronic device according to claim 1, wherein in a case that the components of the electronic device are arranged in one of the second arrangement and the third arrangement:
in a case that there is the first relative position relation between the first component and the second component, the plane where the first viewable area locates is parallel to the plane where the second viewable area locates; and
in a case that there is the second relative position relation between the first component and the second component, the plane where the first viewable area locates is parallel to the plane where the second viewable area locates.

4. The electronic device according to claim 1, wherein an imaging modality in which the first display device displays the first content onto the first viewable area is different from an image modality in which the second display device displays the second content onto the second viewable area.

5. The electronic device according to claim 4, wherein:
the first display device comprises:
a display component, configured to output original light corresponding to the first content, and
an optical path switching component, configured to receive the original light corresponding to the first content which come from the display component, and switch an optical path of the original light corresponding to the first content, to form a visual image corresponding to the first content, wherein the original light is emitted from a first viewable area of the optical path switching component after the optical path of the original light is switched; and
a size of the visual image is larger than a display size of the display component.

6. The electronic device according to claim 1, wherein:
the electronic device further comprises a main body device and a fixing device;
the fixing device at least has a fixing state, and is configured as a part of or an entire annular space, or, a part of or an entire approximate annular space satisfying a first preset condition, the annular space or the approximate annular space relatively fixes the main body device on the periphery of a cylinder satisfying a second preset condition; and
the first component and the second component are disposed in the main body device.

7. The electronic device according to claim 1, wherein the processing device includes:
a relation determining unit, configured to determine whether the first relative position relation or the second relative position relation exists between the first component and the second component, trigger a first control unit in a case that there is the first relative position relation between the first component and the second component, and trigger a second control unit in a case that there is the second relative position relation between the first component and the second component;
the first control unit, configured to control the first display device to switch from displaying the first content to displaying the third content in response to one input device; and
the second control unit, configured to control the second display device to switch from displaying the second content to displaying the fourth content in response to the one input device.

8. A processing method, comprising:
determining whether a first relative position relation or a second relative position relation exits between a first component and a second component;
wherein the first component is connected to the second component through a connector, and there is the first relative position relation or the second relative position relation between the first component and the second component, one or two of a first viewable area displayed by a first display device, a second viewable area displayed by a second display device and a collection area of an input device are located on the first component, and other areas of the first viewable area, the second viewable area, and the collection area are located on the second component;
wherein the first display device and the second display device are hardware devices that output light towards viewers;
controlling the first display device to switch from displaying a first content to displaying a third content in response to the input device, in a case that there is the first relative position relation between the first component and the second component; and controlling the second display device to switch from displaying a second content to displaying a fourth content in response to the input device, in a case that there is the second relative position relation between the first component and the second component, wherein the method is performed by an electronic device and components of the electronic device are arranged in one of a first arrangement, a second arrangement, and a third arrangement, wherein in a case that the components of the electronic device are arranged in the first arrangement:

the collection area is in a relatively viewable state, in a case that there is the first relative position relation between the first component and the second component, the first viewable area is in the relatively viewable state, in a case that there is the second relative position relation between the first component and the second component, the first viewable area is in a relatively unviewable state, the collection area is located on a first surface of the first component, the first viewable area and the second viewable area are located on a first surface of the second component, the first viewable area does not overlap the second viewable area, the first surface of the first component is parallel or approximately parallel to the first surface of the second component, the first relative position relation includes the collection area of the first component overlapping the second viewable area of the second component in a direction vertical to a plane where the first viewable area locates or a plane where the collection area locates, and the second relative position relation includes the collection area of the first component overlapping the first viewable area of the second component in the direction vertical to the plane where the first viewable area locates or the plane where the collection area locates, wherein in a case that the components of the electronic device are arranged in the second arrangement:

the collection area is in a relatively viewable state, in a case that there is the first relative position relation between the first component and the second component, a first distance between the collection area and the first viewable area is smaller than a second distance between the collection area and the second viewable area, and in a case that there is the second relative position relation between the first component and the second component, the first distance is greater than the second distance, and wherein in a case that the components of the electronic device are arranged in the third arrangement:

the collection area is located on a first surface of the first component, the first viewable area and the second viewable area are located on a first surface of the second component and do not overlap each other, the first surface of the first component is parallel or approximately parallel to the first surface of the second component, the first surface of the first component overlaps the first surface of the second component in the direction vertical to the first surface of the second component, the first relative position relation includes the first surface of the first component completely overlapping a first region of the first surface of the second component, and the second relative position relation includes the first surface of the first component completely overlapping a second region of the first surface of the second component.

* * * * *